United States Patent
Levy

(10) Patent No.: US 8,315,995 B1
(45) Date of Patent: Nov. 20, 2012

(54) HYBRID STORAGE SYSTEM

(75) Inventor: Richard S. Levy, Milpitas, CA (US)

(73) Assignee: Peer Fusion, Inc., Miliptas, CA (US)

( * ) Notice: Subject to any disclaimer, the term of this patent is extended or adjusted under 35 U.S.C. 154(b) by 291 days.

(21) Appl. No.: 12/556,518

(22) Filed: Sep. 9, 2009

Related U.S. Application Data

(60) Provisional application No. 61/095,565, filed on Sep. 9, 2008.

(51) Int. Cl.
G06F 17/30 (2006.01)

(52) U.S. Cl. .................................. 707/694

(58) Field of Classification Search .............. 707/694, 707/821–831
See application file for complete search history.

(56) References Cited

U.S. PATENT DOCUMENTS

| 5,636,355 | A | 6/1997 | Ramakrishnan et al. |
| 7,412,433 | B2 * | 8/2008 | Anglin et al. ........................ 1/1 |
| 2003/0033308 | A1 * | 2/2003 | Patel et al. .................... 707/10 |
| 2003/0236961 | A1 * | 12/2003 | Qiu et al. ..................... 711/170 |

OTHER PUBLICATIONS

Sun Microsystems, Inc. white paper for Solaris ZFSa, 2008, 16 pp.
Seltzer M. et al., "A New Hashing Package for UNIX," presented at USENIX—Winter '91—Dallas, TX, 12 pp.
Hewlett Packard Administrator's Guide, VERITAS Volume Manager 3.1, for HP-UX 11i and HP-UX 11i Vrsion 1.5, Jun. 2001, 432 pp.
Litwin, W., "Linear Hashing: A New Tool for File and Table Addressing," IEEE 1980, pp. 212-223.
EMC 2 white paper, "EMC Symmetrix DMX-4 Ultra-Performance Tier 0 Using Flash Drives," Jun. 2008, 12 pp.

* cited by examiner

Primary Examiner — Thu-Nguyet Le
(74) Attorney, Agent, or Firm — Warren S. Wolfeld; Haynes Beffel & Wolfeld LLP

(57) ABSTRACT

Roughly described, a tiered storage system has a filesystem that promotes and demotes data among tiers at block granularity. It maintains a logical-to-physical mapping which indicates for each block in a file both the assigned tier and the physical block number within the tier. Methods for performing file- and block-level manipulations are described. In an embodiment, a nominal tier is managed by a native filesystem, and higher tiers are managed by a super filesystem. The super filesystem manages promotion and demotion among the tiers, interfacing with higher tiers directly but interfacing with the nominal tier only through the native filesystem. The native filesystem defines the file namespace in the system, and the logical-to-physical block mapping for blocks in the nominal tier. The super filesystem defines the logical-to-physical mapping for blocks in the higher tiers, but retains the file identification information as defined by the native filesystem.

16 Claims, 22 Drawing Sheets

TIER SUPER BLOCK

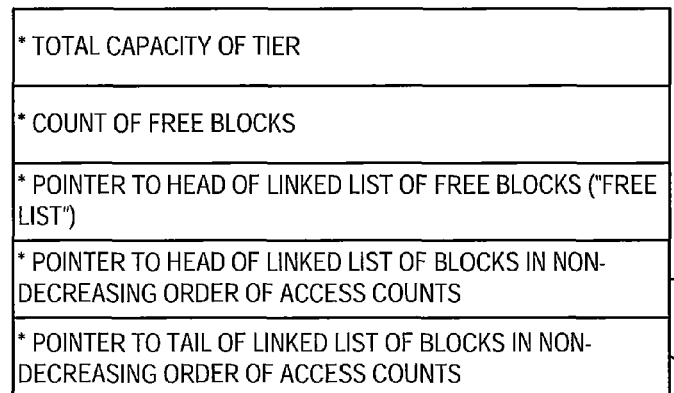

810

* TOTAL CAPACITY OF TIER
* COUNT OF FREE BLOCKS
* POINTER TO HEAD OF LINKED LIST OF FREE BLOCKS ("FREE LIST")
* POINTER TO HEAD OF LINKED LIST OF BLOCKS IN NON-DECREASING ORDER OF ACCESS COUNTS
* POINTER TO TAIL OF LINKED LIST OF BLOCKS IN NON-DECREASING ORDER OF ACCESS COUNTS

812

LINKED LIST OF BLOCKS IN TIER IN NON-DECREASING ORDER OF ACCESS COUNTS

| PHYS BLOCK # | FILE ID | LOGICAL BLOCK # | NEXT/PREV | IS BLOCK CURRENTLY IN MEM? |
|---|---|---|---|---|
| | | | | |
| | | | | |
| | | | | |
| | | | | |
| | | | | |
| | | | | |

FIG. 8

HYBRID STORAGE SYSTEM

CROSS-REFERENCE TO OTHER APPLICATIONS

Applicants hereby claim the benefit under 35 U.S.C. 119(e) of U.S. provisional application No. 61/095,565, filed 9 Sep. 2008. The provisional application is hereby incorporated by reference herein for its teachings.

BACKGROUND

1. Field of Invention

The invention relates to computer filesystems and management of persistent storage in a tiered storage system.

2. Description of Related Art

Storage is typically divided into data blocks that are addressable by the underlying hardware. The blocks are typically all of equal size, but on some devices or some systems they can be of different sizes. Stored content occupies one or more blocks of data that when ordered into a logical sequence forms a file. Filesystems typically organize files into a hierarchy of directories for ease of use. Directories are themselves files created by the filesystems that consist of file descriptor records (sometimes called inodes). Starting at the root directory of a filesystem, it is possible to navigate through the hierarchy of sub-directories to reach a desired file.

The typical storage device is controlled via a device driver and can only understand physical block addresses that correspond to its capacity. Neither the device nor its device driver are aware of the semantics of the block read or written. For example neither is aware of the file context or the logical position within the file of the physical block.

Filesystems are attached (sometimes called mounted) to storage devices that they access through device drivers. A filesystem software module manipulates the filesystem, and performs operations on it at the request of the operating system. A device driver is a software module usually provided by the vendor of the storage device, but sometimes provided in conjunction with an operating system or from some other source. In a simple case the device driver interfaces the filesystem module with a single storage device such as a hard disk drive (HDD), CD/DVD or solid state drive (SSD). In more complex cases the device driver interfaces the filesystem module with a RAID controller or a logical volume manager that controls several storage devices. In all cases the filesystem module communicates with a single device driver that encapsulates one or more storage devices in such a way that they appear to the filesystem module as monolithic storage capacity. In particular the filesystem module can access any block within the available storage capacity but cannot address a particular storage device encapsulated by the device driver. If the filesystem module needs to know the geometry of the storage device abstraction (e.g. the count of platters, tracks per platters, sectors per track, the sector size, etc.), it can discover such information through the device driver API.

Most filesystems manage the physical blocks available on a device through a bitmap where each bit corresponds to a block on the device and serves to indicate whether that physical block is available or allocated. The physical blocks are viewed as a contiguous sequence of uniform capacity and near-uniform performance (in some hardware the disk geometry introduces some performance difference across cylinders due to rotation).

In conventional storage systems storage devices are managed through dedicated filesystem instances. Often, a filesystem instance is identified by its mount point or root directory. For example, in a Microsoft® Windows® operating system, filesystem instances are often identified by a letter followed by a colon and a backslash (e.g. 'c:\'). In Unix operating systems they are often identified by a slash and a root directory name (e.g. '/usr'). It is possible for more than one filesystem to occupy a single hardware storage unit (such as two partitions on a single HDD), or one filesystem to occupy more than one hardware storage unit (such as a multiple disk drives in a RAID array, or multiple networked computer systems in a network filesystem). Separate filesystems are independent of each other, however. They do not cooperate and they require that all their files be entirely contained within one instance. Thus while it is possible to move a file from one filesystem to another (capacity allowing), it is not possible for multiple filesystems to share in the management of the blocks of a single file.

Files are data containers for which filesystem modules manage the allocation, de-allocation and access to data blocks contained in the file. A "file", as used herein, has a file ID or file identifier which is unique with a filesystem. If the operating system is a Unix®, Linux®, VMS® or Microsoft® Windows®-based operating system, then the term "file" as used herein is co-extensive with the term as used in relation to those operating systems. A "file" can have any number of data blocks, including zero if the file is empty. The filesystem exposes the contents of a file to higher levels of software (e.g. an operating system or an application program) as a sequence of contiguous logical blocks, and the filesystem maps the logical blocks to the corresponding physical blocks as exposed to it by the device driver. The physical blocks allocated to a file are unlikely to be contiguous. In addition, since the device driver can encapsulate a wide variety of physical storage devices, the device driver may perform another mapping of physical blocks to blocks on the actual storage media that are in a sense even more physical. The latter mapping is hidden from the filesystem by the device driver, however, so for the purposes of the present description, the data blocks as exposed to the filesystem by lower level software are referred to herein as "physical" blocks.

Modern applications have a wide variety of storage needs with varying characteristics. For example, a database system might have a huge amount of data records, any one of which is accessed only rarely. The same database system might also have an index file that is much smaller than the stored data, but which is accessed constantly. A wide variety of storage devices are also available, defined by their performance characteristics in terms of input and output per second (IOPS) and throughput (sequential access) in megabytes per second. It is normally the case that the greater the capacity of a storage device the lower its performance and the higher the performance of a storage device the smaller its capacity.

In order to maximize performance at minimum cost, storage systems are available which offer two or more "tiers" of storage, with higher tiers offering better performance but smaller capacity, and lower tiers offering larger capacity but lower performance. Application programs that are aware of the different tiers are often designed to store bulky, infrequently accessed data files on a lower tier and a much smaller set of frequently accessed files on a higher tier. Database systems, for example, are often designed to store data records on lower tiers and index files on higher tiers. Often a database administrator is employed to periodically analyze usage records of various files, and manually promote or demote files among the tiers to enhance performance in response to actual usage patterns. As used herein, two different storage units are considered to occupy different "tiers" only if their positions in the performance vs. capacity tradeoff are significantly different, different enough for an allocation of data among them to reduce overall storage costs enough, or improve overall performance enough, to be worthwhile. Typically the devices in different tiers use different storage technology.

Conventionally, the assignment of data among tiers of a tiered storage system is performed at the granularity of a file. It often happens, however, that for large files, some parts of it are accessed much more frequently than other parts of it. Conventional tiered storage systems do not have the ability to split a file among more than one tier, under control of the filesystem or higher level software.

Nor is it possible for conventional systems to implement sub-file granularity of data assignment among tiers under control of the higher level software. In order to store and retrieve data from a file, application programs specify a command, a filesystem (e.g. 'C:\'), a particular file according to the semantics defined by the filesystem (e.g. a directory path and file name, or an inode number), an offset within the file and a byte count to read or write. The operating system passes the request to the filesystem module which controls the specified filesystem, which in turn converts the offset into a logical block number that it looks up in the inode of the file to determine the corresponding physical block number. The physical block number is passed to the device driver to execute the I/O operation.

This control flow precludes the promotion and demotion at the granularity of data blocks based upon their usage pattern as none of the components has sufficient information. The program initiating the I/O cannot participate as it lacks any knowledge of internal structures and protocol of the filesystem and storage device. The operating system similarly lacks knowledge of internal structures and protocol of the filesystem and storage device. The filesystem module knows the logical block to physical block mapping and could compute the popularity of blocks as they are accessed; however it only manages blocks on its attached storage device and is unaware of and does not manage other available storage devices. Lastly the storage device driver knows the physical block number and may be aware of other storage devices available, but it does not know the logical block number and cannot manipulate the logical block to physical block mapping.

It would be desirable to promote and demote data among tiers in a tiered storage system at a granularity smaller than a full file, since promoting and demoting at file granularity often can be impractical. First, space must be available for the entire file on the storage device to which the file will be promoted, and this may not be true for faster (and smaller) storage devices. Second, moving an entire file can be time consuming, especially where the file is large. And third, moving an entire file may be overkill as the great bulk of performance gains could be achieved by improving access to only a relatively small part of the file that will be accessed more frequently than other parts. However, until now, sub-file granularity of data assignment among tiers has not been possible.

SUMMARY

An opportunity therefore arises to create a robust solution to the problems limiting the granularity of data access among tiers of a tiered storage system. Better computer systems, with higher capacity, higher performance and lower cost may result.

Roughly described, embodiments of the invention have a filesystem for storage systems consisting of several classes of storage devices offering a tradeoff between capacity and performance. One embodiment has a storage device hierarchy including solid state disks (SSD), serial attached SCSI (SAS) disks, serial ATA (SATA) disks and a tape library. In this embodiment the SSD has the highest performance and the smallest capacity whereas the tape library has the greatest capacity and the lowest performance.

Embodiments of the present invention measure the popularity of logical file blocks by counting the number of times they are accessed. The most frequently accessed blocks on a storage tier are promoted to a higher storage tiers. This promotion may cause blocks on the higher storage tiers to be demoted to lower tiers in order to create space for the promoted blocks. Promotion and demotion occur dynamically during normal usage of the storage system and are transparent to the operating system and application programs. Thus the data that is accessed most frequently resides of the faster storage devices and the bulk of the data that is accessed less frequently resides on the slower storage devices. (As used herein, no distinction is made between the storage of data "in" or "on" a storage device or tier.)

One of the storage system's tiers is designated the Nominal Storage Tier (NST). The NST is where all files are initially created and where meta-data such as directories, protection, ownership, quotas, etc. are stored. Thus the NST is also sometimes referred to herein as the "default" storage tier. Usually a Native Filesystem (NFS) that is part of the operating system is mounted on the NST. The other storage tiers are directly managed by a Super Filesystem (SFS) as described below. Access to the multi-tier storage system is through the SFS only (e.g. not the NFS). All data and meta-data requests go to the SFS which implements them on one or more tiers.

A Block Descriptor Table (BDT) is used to identify the storage tier for each block of a file. As blocks of a file are accessed their access counts are incremented. Blocks that meet a minimal access count threshold are candidates for promotion. Blocks that fall below a minimal access count threshold are candidates for demotion. A BDT is created for each file that contains blocks that are candidates for promotion as well as blocks that were promoted or demoted. Most blocks of a file will not meet these criteria thus most blocks of a file will not appear in its BDT and will be stored on the NST. Most files will not have blocks that meet the BDT criteria and thus most files will not have a BDT.

Embodiments of the invention automatically ensure the optimal use of all storage tiers by dynamically promoting and demoting their blocks. Files that are no longer used have their contents eventually moved entirely to the lowest tier to free up space for new files. When the lowest tier is a tape library the files will have been archived. This saves space on the higher tiers as well as decreases the amount of data to backup.

The above summary is provided in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description that is presented later. Particular aspects of the invention are described in the claims, specification and drawings.

BRIEF DESCRIPTION OF THE DRAWINGS

The invention will be described with respect to specific embodiments thereof, and reference will be made to the drawings, in which:

FIG. 8 illustrates the structure of a tier super block and associated data structures that are present on each higher level tier of persistent storage in FIG. 2.

DETAILED DESCRIPTION

Figure 1:
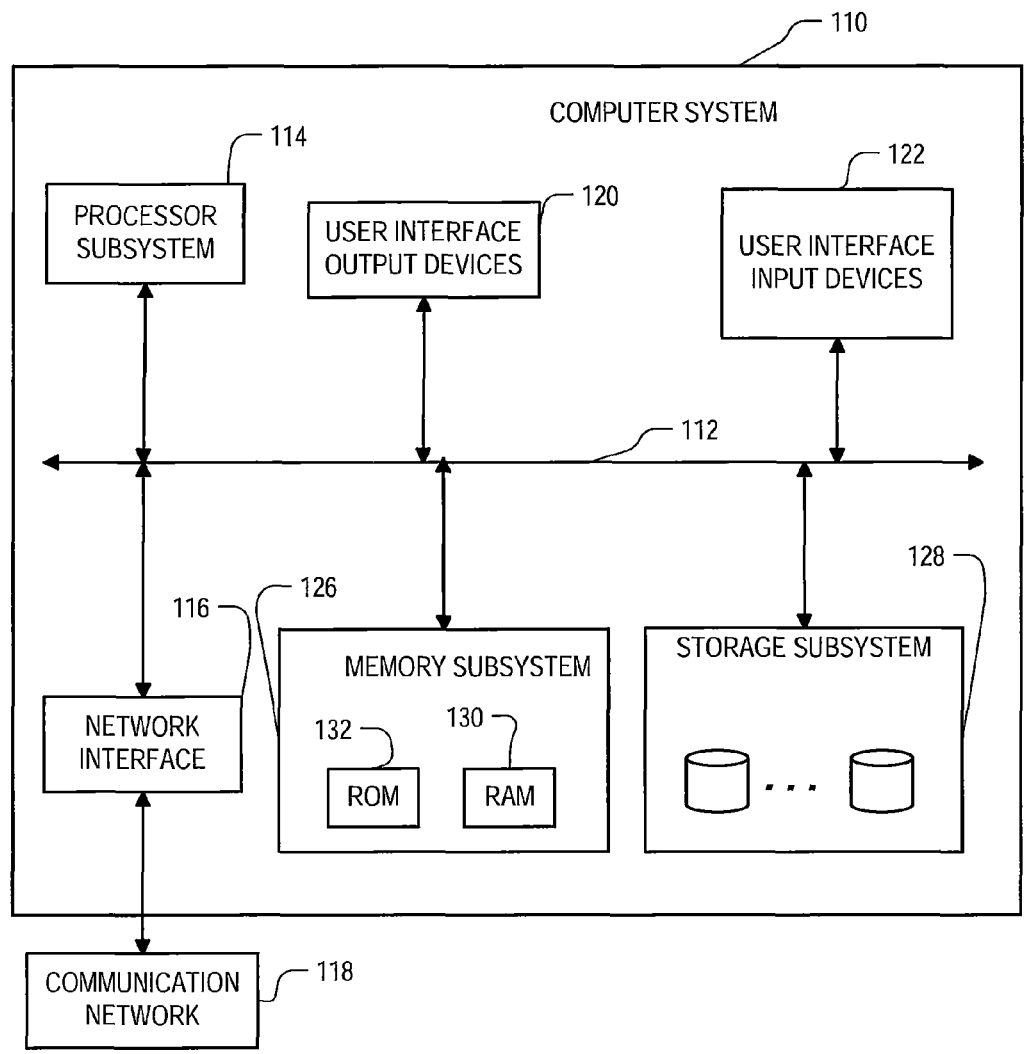
FIG. 1 is a simplified block diagram of a computer system 110 that can be used to implement the software aspects of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Overview

Embodiments of the invention have a filesystem for hierarchical storage systems consisting of multiple tiers of storage devices. Each tier makes a different tradeoff between performance and capacity. In one embodiment the performance hierarchy is topped by SSD drives followed by SAS drives, SATA drives and tape libraries. The reverse hierarchical order describes the capacity of each tier of this embodiment. Embodiments of the invention implement a Super Filesystem (SFS) that transcends multiple storage devices by interfacing either with their filesystems or directly with their device drivers.

The performance of the multi-tier storage system is improved by moving the most frequently accessed data blocks to the faster tiers and moving less frequently accessed data blocks to the slower tiers. The frequency of access to data blocks is continuously monitored so that the promotion and demotion of blocks can occur dynamically and automatically. A data block in the SFS can be configured to any size as appropriate for the type of content stored. Typically a block is no smaller that 1 KB and is usually a power of 2 such as 2 KB, 4 KB, . . . , 1024 KB, etc.

The Nominal Storage Tier (NST) is the tier where all files are initially created. It is typically chosen because it has sufficient capacity and performance characteristics for the desired throughput of the storage system. In one embodiment, the NST is managed by a native filesystem (NFS) module that is normally only accessed via the SFS. (The term "NFS" as used herein is not to be confused with "Network Filesystem", which has the same acronym.) The NFS module manages all the usual metadata (e.g. directories, links, ownership, protection, quotas, ACL's, and logical-physical block mappings, etc.) for the NST. As with all conventional filesystems the NFS module is unaware of either the SFS or the other tiers. The NFS module does not control any of the other tiers, and has no knowledge of logical-physical block mapping on those tiers. All other tiers are directly managed by the SFS without a native filesystem module. They contain data blocks that were promoted and demoted by the SFS as well as certain SFS structures required to manage their capacity.

The SFS is integrated with the operating system's Virtual Filesystem (VFS) API to provide a standard filesystem interface for applications. In one embodiment, higher level software is aware of the presence of an SFS which appears to the higher level software as a separate filesystem (e.g. a separate 'Z:\' mount point in Microsoft® Windows®.) The SFS may even appear as a mount point within the NFS of the NST. Other software can continue to access the NST by way of the NFS, by issuing requests that designate the NST mount point (e.g. 'C:\'). In another embodiment, the SFS can be implemented transparently to the higher level software, by inserting a filter between the operating system and the NFS module. The filter traps all commands which designate the mount point of the NST, and routes the command to either the SFS or to the NFS module as appropriate. In this case higher level software can be unaware of the presence of an SFS. (As used herein, the terms command, inquiry and request are all used interchangeably.)

In either embodiment, most metadata-related requests received by the SFS are passed to the NFS of the NST as they have no impact on the other tiers. Such requests include operations on directories, hard links, symbolic links, ownership, protection, file and directory renaming, and so on. Some metadata-related requests require action by both the SFS and the NFS as they potentially impact all storage tiers. Such requests include file deletion, truncation, opening and closing. These requests are handled as required by the SFS, which makes additional calls as required to the NFS. Requests to read, write, and truncate files may span multiple storage tiers. The SFS divides these requests along storage tier boundaries and implements the sub-requests on their corresponding tiers. For example a request to read some blocks from a file is converted into multiple sub-requests to read blocks from the tiers where they are stored and passed either to the tiers' device drivers or to the NFS for blocks located in the NST. Similarly a request to decrease a file's size through truncation is implemented on the NST and converted into sub-requests to de-allocate blocks on the other tiers.

In an embodiment, the SFS is the only filesystem for all storage tiers other than the NST. Tiers other than the NST can be accessed only by the SFS and only the SFS determines how their capacity is utilized. The SFS does not export filesystem semantics for these tiers to higher level software so applications are not aware these tiers exist and can not refer to them directly. For each such tier the SFS manages the storage capacity as a list of the available blocks. For each tier a super block is stored at physical block number 0 and also replicated at several locations across the tier to ensure resiliency in case of media error. The super block describes the total capacity of the tier, the count of free blocks, and the address of the first free block in the linked list of free blocks. It also contains pointers to the head and tail of a doubly linked list of blocks on the tier in order of access counts, as described hereinafter. By referring to the super block it is possible to determine how many free blocks are available and allocate blocks by removing them from the linked list of free blocks and decrementing the count of free blocks. Similarly it is possible to de-allocate blocks by adding them to the list of free blocks and incrementing the count of free blocks. The SFS does not represent on these tiers the metadata hierarchy of the NST's NFS. For example these tiers have no directories, file names, ownership, protection. Instead the metadata pertaining to a block presently on another tier is managed in the usual course by the NFS, which does so with respect to the entire file; the particular data block presently on another tier can be thought of as merely having been checked out.

The SFS manages a Block Promotion and Demotion database (BPD) which is stored on the NST. The BPD contains the list of all files that have blocks that were promoted or demoted out of the NST, as well as some files whose blocks are all currently in the NST. The BPD is also sometimes referred to herein as a "block assignment database", since among other things it indicates the tier to which each block is assigned. It indicates the tier on which each block is persistently stored if it is not currently cached in memory, or if it is, then the tier onto which the block will be written when it is written back to persistent storage.

The inode numbers assigned to the files by the NST's NFS are used to uniquely identify all files in the BPD. Though not essential, the list of files in the BPD preferably is organized as a Persistent Linear Hash (PLH) table using the inodes as keys for insertion lookup and deletion. Each file has a Block Descriptor Table (BDT) that preferably is also organized as a PLH table. A PLH is an efficient means of organizing lists of sparse data that have essentially random keys. While inode numbers are typically sequential, the SFS inserts them into the BPD in random order driven by their usage patterns. Similarly blocks in a file are appended sequentially as the file grows, but they are inserted into the BDT in random order corresponding to their promotion and demotion. Other means of organizing the list of files and their blocks can be devised that perform the same task as the PLH.

In the BDT table the logical block number within the file is the key used for accessing entries. Each entry specifies the storage tier, the physical block number and the access count. The BDT is a sparse representation of some of the blocks of a data file. For typical access patterns few of the file's blocks will have an entry in the BDT. Yet for large files (e.g. multi-gigabytes) the promotion of a small percentage of the blocks can amount to hundreds of megabytes of data. BDT entries are created and deleted in no predictable order as blocks are accessed.

The PLH algorithm is derived from Linear Hashing (LH). LH is an efficient algorithm for the management of sparse data. (See Linear Hashing: A New Tool for File and Table Addressing by Witold Litwin, IEEE, pp. 212-223 (1990), incorporated by reference herein for its teachings.) LH is designed for dynamic structures created in RAM or virtual memory with, for example, overflow buckets accessed via simple memory pointers. In embodiments of the present invention all the data structures are made persistent so as to be available after the host computer reboots and also because they can be too large to fit in virtual memory. There have been efforts to make LH persistent. (See A New Hashing Package for UNIX, by Margo Seltzer and Ozan Yigit, USENIX, pp. 1-14 (Winter 1991), incorporated by reference herein for its teachings.) In Seltzer & Yagit, the LH table is created in a file within a conventional filesystem. Overflow buckets are pre-allocated between generations of primary bucket pages and cannot be deleted from their file as the filesystem semantics will only allow the truncation of a file and not the selective deletion of arbitrary blocks in the middle. Embodiments of the present invention overcome these limitations through the SFS.

The PLH algorithm is preferred because it efficiently manages small hash tables as well as very large hash tables with hundreds of millions of blocks. A PLH table has a header that includes its size in terms the bucket count and the maximum count of entries per bucket. The buckets are located on persistent storage and moved to RAM on demand. The physical addresses of the first n buckets are included in the PLH header where n is proportional to the block size of the SFS. The last four slots in the PLH header are reserved for the addresses of blocks containing the addresses of additional buckets with varying numbers of levels of indirection. Thus the first slot has a single indirection and so has the address of a block that contains m bucket addresses. The second slot has a double indirection and so has the address of a block that contains m addresses of blocks of a single indirection. The third slot has a triple indirection and so has the address to a block that contains m addresses of blocks of double indirection. The fourth slot has a quadruple indirection and so has the address to a block that contains m addresses of blocks of triple indirection. Here m is proportional to the block size of the SFS and even with m as small as 1 KB it is possible to represent hundreds of terabytes.

A PLH bucket has a header containing the bucket number, the address of the next overflow bucket, and the count of free slots. Each entry in the bucket includes its unique key with additional contents specific to the context in which the PLH table is used. For the BPD list of files a bucket entry includes the inode number as the key, the address of the first block of the BDT for that inode, and the logical block numbers with the highest and lowest use counts within that file. For the BDT list of blocks a bucket entry includes the logical block number, the tier to which the block is assigned, the physical block address on that tier, and its access count.

The SFS cache is a non-persistent data repository above the hierarchy of storage tiers and the BPD. It is provided to speed-up multi-tier I/O. The SFS cache is the central transit point for all blocks that are read or written. The SFS cache is aware of the data structures necessary to manage blocks in multiple tiers as described below. When a request to read a block is received, the block is first looked up in the cache. Finding the block in the cache is the fastest way to fulfill the request as it avoids reading from a storage device. Finding a block in the cache still increments the block's access count and this may later trigger the block's promotion. Block promotion is the main mechanism for block demotion. Other policy-driven mechanisms exist for block demotion such as ageing, etc. The blocks in the cache are the latest blocks accessed and the only immediate candidates for promotion. Thus the cache is the stage for block promotion as a block cannot be promoted unless it is first cached.

Each file that contains blocks that were promoted or demoted has an associated Block Descriptor Table (BDT) that is used to identify the storage tier for each block of that file. Files without an associated BDT have all their blocks assigned to the NST. As blocks of a file are accessed (read or written to) their access counts are incremented. The blocks that meet a minimal access count threshold are candidates for promotion. The blocks having the lowest access counts in any tier that is about to receive a promotion, are candidates for demotion. A BDT is created for each file that contains blocks that are candidates for promotion as well as blocks that were promoted or demoted. Most blocks of a file will not meet these criteria thus most blocks of a file will not appear in its BDT and will be stored on the NST. Most files will not have blocks that meet the BDT criteria and thus most files will not have an associated BDT.

When a file is initially created it is empty and has no BDT. As the file is populated with blocks their access count is computed in the SFS cache. When a block is flushed from the cache and its access count fails to meet a minimal threshold, the block's access count is lost. If it does meet the threshold, then a persistent record of the block's access count is made in a BDT. The access count may not be sufficient to promote the block but is sufficient to begin tracking the block as a candidate for promotion. The minimal threshold to begin tracking a block is, in one embodiment, a fixed number. In another embodiment it can depend on a variety of factors relating a block's access count with that of blocks that were previously promoted or demoted. For example the factors can specify how close the block must be to the minimal access count of the next promotional tier. Thus when flushed from the cache, a block that was previously a candidate for promotion may have its BDT entry deleted if its access count does not keep up with the evolving minimal threshold. When the last entry in a file's BDT is deleted, the BDT is deleted as well.

The process of reading a block from a file into the SFS cache starts by looking for the block in the SFS cache. If the block is not found and the file has a BDT, it is looked up in its file's BDT. If the file has no BDT or the block is not found in the BDT, it is read from the NST via the NFS. A new record of its access count is created in memory and is initialized to zero. If an entry is found in the BDT, the block is read from the storage tier indicated and its access count is retrieved from the corresponding BDT entry. Upon successfully reading the block from its tier it is marked as clean. The block's access count is then incremented in the SFS cache.

There are at least three scenarios for writing a block. The first two scenarios are initiated by applications and the third by the SFS. In the first (common) scenario the block is stored in the SFS cache and not immediately written to a storage device for performance considerations. In the second scenario the block is immediately written to a storage device. In the third scenario the block is written to a storage device as part of flushing the SFS cache.

The process of writing a block in the first scenario starts by looking for the block in the SFS cache. If the block is not found it is created in the SFS cache. If the block is found it is updated in the SFS cache. The block is then marked as modified and its access count is incremented in the SFS cache.

The process of writing a block in the second scenario starts by looking for the block in the SFS cache. If the block is found it is updated and its access count is incremented. If the block is not found in the SFS cache and the file has a BDT, it is looked up in its file's BDT. If an entry is found in the BDT, the block's access count is updated in the SFS cache. If there is no BDT associated with its file or the block is not found in the BDT, it is stored in the SFS cache and its access count is set to one. If the block's new access count triggers a promotion to a new tier, a free block in the new tier is selected. Finally the block is written to its storage tier and marked as clean in the SFS cache.

The process of writing a block in the third scenario starts with a block in the SFS cache. The block's access count is not incremented as the third scenario does not reflect the block's usage pattern since it is not initiated by an application. If the block's access count triggers a promotion to a new tier, a block from the new tier is selected. The block is then written to its storage tier. Finally the block is marked as clean and deleted from the cache if necessary.

A block is deleted from the SFS cache in order to reclaim cache space for another block or because its file is being closed. If the block has no BDT entry its access count is checked and a BDT entry is created if the block is a candidate for promotion or has been promoted. A block's BDT entry is no longer needed in the SFS cache once the block is deleted from SFS cache, so in one embodiment the BDT entry is written to persistent storage when the block is deleted from the cache. In another embodiment the BDT entry may in fact remain in the SFS cache for a longer period of time, for example if it is part of a larger segment of data that will be written back to persistent storage in a single step. (As used herein, a "data segment" is a segment of data, with no implication of length, contiguity or granularity. A full file is a data segment, as is a data block that is smaller than a full file.)

Detailed Description of an Embodiment

The following is a detailed description of a particular embodiment.

FIG. 1 is a simplified block diagram of a computer system 110 that can be used to implement the software aspects of the present invention. While FIG. 2 indicates individual components or modules as carrying out specified operations, it will be appreciated that each component actually causes the computer system 110 to operate in the specified manner.

Computer system 110 typically includes a processor subsystem 114 which communicates with a number of peripheral devices via bus subsystem 112. These peripheral devices may include a memory subsystem 126 and a storage subsystem 128, user interface input devices 122, user interface output devices 120, and a network interface subsystem 116. The input and output devices allow user interaction with computer system 110. Network interface subsystem 116 provides an interface to outside networks, including an interface to communication network 118, and is coupled via communication network 118 to corresponding interface devices in other computer systems. Communication network 118 may comprise many interconnected computer systems and communication links. These communication links may be wireline links, optical links, wireless links, or any other mechanisms for communication of information. While in one embodiment, communication network 118 is the Internet, in other embodiments, communication network 118 may be any suitable computer network.

The physical hardware component of network interfaces are sometimes referred to as network interface cards (NICs), although they need not be in the form of cards: for instance they could be in the form of integrated circuits (ICs) and connectors fitted directly onto a motherboard, or in the form of macrocells fabricated on a single integrated circuit chip with other components of the computer system.

User interface input devices 122 may include a keyboard, pointing devices such as a mouse, trackball, touchpad, or graphics tablet, a scanner, a touch screen incorporated into the display, audio input devices such as voice recognition systems, microphones, and other types of input devices. In general, use of the term "input device" is intended to include all possible types of devices and ways to input information into computer system 110 or onto computer network 118.

User interface output devices 120 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 110 to the user or to another machine or computer system.

Memory subsystem 126 and storage subsystem 128 collectively store the basic programming and data constructs that provide the functionality of certain embodiments of the present invention. For example, the various modules implementing the functionality of certain embodiments of the invention may be stored in memory subsystem 126 and storage subsystem 128 collectively. These software modules are generally executed by processor subsystem 114.

Memory subsystem 126 typically includes a number of memories including a main random access memory (RAM) 130 for storage of instructions and data during program execution, one or more levels of cache memory, and a read only memory (ROM) 132 in which fixed instructions are stored. Storage subsystem 128 provides persistent storage for program and data files, and includes all the storage tiers used by embodiments of the invention. This subsystem may include one or more hard disk drives, floppy disk drives along with associated removable media, DVD/CD drives, optical drives, and/or removable media cartridges. The Super Filesystem described herein, and modules implementing the functionality of certain embodiments of the invention, may have been provided on a computer readable medium such as one or more CD-ROMs, and may be stored in storage subsystem 128. The host memory 126 contains, among other things, computer instructions which, when executed by the processor subsystem 114, cause the computer system to operate or perform functions as described herein. As used herein, processes and software that are said to run in or on "the host" or "the computer", execute on the processor subsystem 114 in response to computer instructions and data in the host memory subsystem 126 including any other local or remote storage for such instructions and data.

Bus subsystem 112 provides a mechanism for letting the various components and subsystems of computer system 110 communicate with each other as intended. Although bus subsystem 112 is shown schematically as a single bus, alternative embodiments of the bus subsystem may use multiple busses.

Computer system 110 itself can be of varying types including a personal computer, a portable computer, a workstation, a computer terminal, a network computer, a television, a network appliance, a NAS device, a mainframe, or any other data processing system or user device. Due to the ever-changing nature of computers and networks, the description of computer system 110 depicted in FIG. 1 is intended only as a specific example for purposes of illustrating the preferred embodiments of the present invention. Many other configurations of computer system 110 are possible having more or less components than the computer system depicted in FIG. 1.

Figure 2:
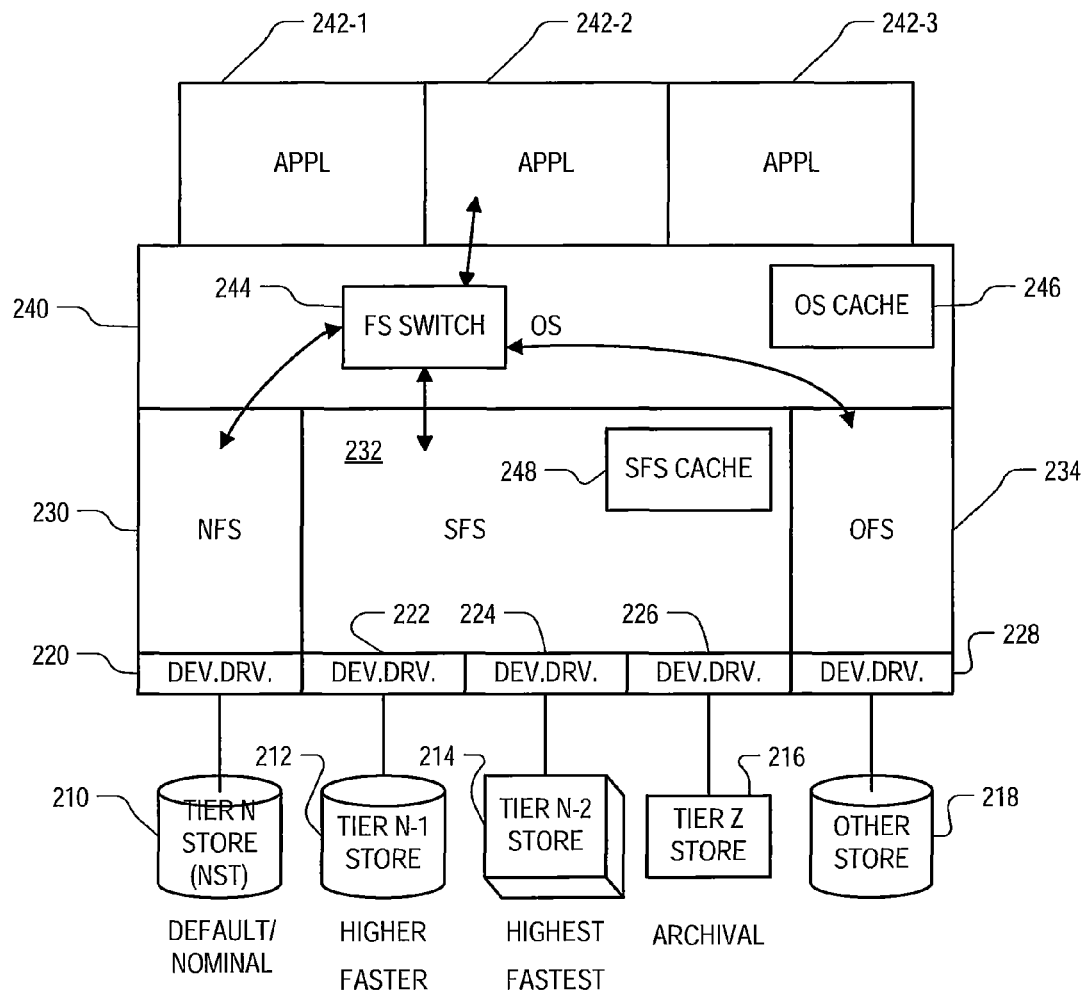
FIG. 2 illustrates the overall software architecture of an embodiment of a system incorporating features of the invention.

FIG. 2 illustrates the overall software architecture of an embodiment of a system incorporating features of the invention. Several tiers of storage devices are shown symbolically in the drawing, designated as tier N, tier N-1, and tier N-2. Since this is a three-tiered storage system (plus archive), the tiers can also be numbered tier 3, tier 2 and tier 1, respectively. Tier N 210 is the Nominal storage tier (NST). It has the largest capacity but the lowest performance of the three tiers, and may, for example, be implemented with one or more SATA disk drives. Tier N-1 212 has smaller capacity but better performance than the NST, and may be implemented for example with one or more SAS disk drives. Tier N-1 214 has the smallest capacity but the best performance of the three tiers, and may be implemented for example with one or more SSD's. As used herein, the "higher" the tier, the smaller the tier number. Thus of the three tiers 210, 212 and 214, tier N-2 214 has the smallest tier number but is considered the "highest" tier. Also, typically the higher the tier the faster the storage technology. Tier N-2 store 214 has the smallest number (N-2) but the best performance. A system may also have a still lower (typically the slowest) tier, for archival storage. This tier is sometimes referred to herein as Tier N+1 or Tier Z, and is shown illustratively as tier 216 in FIG. 2. It will be appreciated that while each higher tier in the tiered storage system has smaller capacity than the tiers below it, this is not an essential requirement of the system. Aspects of the invention have the most value if, at least, each higher tier has faster performance, specifically faster access time and even more specifically faster read access time, than the tiers below it.

Each storage tier is controlled by a corresponding device driver, which is a software module executed by the computer system 110 (FIG. 1). All operations performed on data in a given storage device are controlled by the device's driver. The device driver is, in turn, controlled by commands issued by higher level software through an application programming interface (API). For manipulating particular blocks of a file on a storage device, higher level software specifies a physical block number on which to perform it. The device driver has no knowledge of file or logical block semantics; those are all hidden from the device driver by a filesystem software module. Nor do any of the device drivers in FIG. 2 have any awareness of or control over any of the other storage tiers or their device drivers. As shown in FIG. 2, tier N store 210 is controlled by device driver 220; tier N-1 store 212 is controlled by device driver 222; tier N-2 store 214 is controlled by device driver 224; and tier Z store 216 is controlled by device driver 226.

Above the device drivers in FIG. 2 are software modules that implement filesystems on the storage tiers. As used herein, a "filesystem" is a collection of files and certain of their attributes. It also defines a namespace for file ID's (identifiers) so that files under control of the filesystem can be referred to uniquely. Stated another way, file ID's are defined by the filesystem. Typically a filesystem contains such metadata as the directory structure, protection, ownership, quotas, links, access control lists (ACLs) and a mapping of logical file identifier (such as directory path and filename) to inode number file identifier. At a minimum, as used herein, a "filesystem" manages the mapping of logical block numbers within a file to physical block numbers as understood by the device driver for the storage device on which the filesystem is mounted. Thus a filesystem is data and metadata. A "filesystem software module", also called a "filesystem module", as used herein refers to a collection of software instructions which, when executed on a computer system such as 110 (FIG. 1), performs or manages operations on the data and metadata of the "filesystem".

A filesystem module exposes the filesystem to higher level software through an API. A filesystem API includes functions such as creating and deleting files, reading from them and writing to them, renaming them, moving them around in the directory structure, establishing and modifying ownership, protection, quotas, ACLs, and so on. Some API functions permit higher level software to manipulate individual blocks within a file, but the kinds of manipulations at the block level are limited and the caller must reference the block by file ID and logical block number within the file. Blocks cannot be referenced by higher level software individually, without the context of a file. As used herein, higher level software is said to interface with the NST using "file identification semantics" and "logical data block identification semantics", as opposed to "physical block identification semantics", which is how the filesystem interfaces with the device driver.

Above device driver 220, therefore, is the NFS module 230, which implements the native filesystem on the nominal storage tier. Among other things, NFS module 230 manages the mapping of logical file identifier to inode number, and manages the mapping of logical block numbers within a file to physical block numbers as understood by device driver 220. In the present embodiment, data blocks retain the logical file identifiers and logical block numbers even when the blocks are promoted to a higher tier; this information is defined by the NFS, and the SFS module does not alter it. Data blocks also retain their physical block ID within the NST when the block is promoted to a higher tier, since in the present embodiment the block is not de-allocated in the NST. The block's physical block ID within the NST is not used by the SFS module, but when a block is demoted back into the NST, the NFS re-uses the allocated physical block on the NST.

NFS module 230 has exclusive control over the NFS. It is the filesystem module that controls device driver 220 most directly, and therefore is the filesystem module that controls NST 210 most directly. NFS module 230 also does not control any operations on any other tier, nor is it aware of such tiers. The NFS may be a conventional FAT or NTFS filesystem (in Windows) or UFS filesystem (Unix), or a ZFS filesystem (Sun Microsystems), for example, and NFS module 230 may be a conventional module that is distributed together with the operating system. A description of NTFS may be found in Rajeev Nagar, "Windows NT File System Internals" (O'Reilly, 1997), incorporated by reference herein. ZFS is described in Sun Microsystems, "The Last Word In File Systems Just Got Better: Solaris ZFS™ File System Features and Enhancements in the Solaris™ Operating System for Enterprise Users", White Paper (September 2008), incorporated herein by reference. Other filesystems are described in the following publications, all incorporated by reference herein: Pate, "UNIX Filesystems: Evolution, Design, and Implementation" (Wiley, 2003); McDougall and Mauro, "Solaris Internals™: Solaris 10 and OpenSolaris Kernel Architecture (2nd Edition)" (Prentice Hall 2006); Bar, "Linux File Systems" (McGraw-Hill 2001); and Bovet and Cesati, "Understanding the Linux Kernel", third edition (O'Reilly Media 2005).

Above all three device drivers 222, 224 and 226 is an SFS filesystem module 232. The SFS is a filesystem in that among other things, it maintains a mapping of logical-to-physical block numbers, though for blocks stored on the NST, the SFS leverages the mapping maintained in the NFS rather than keeping its own. The SFS itself maintains the mapping for data blocks stored on either tier N−1 212 or N−2 214. When higher level software makes a block read or write request to the SFS, it does so using file and logical block identification semantics. The SFS module 232 determines from this which tier is currently assigned the block, and if it is one of the tiers that the SFS module 232 manages directly, it consults its own maps to determine the physical block number on the particular tier. It then makes appropriate requests to the device driver for that tier, using physical block identification semantics. If the SFS module 232 determines that the block is currently assigned to the NST 210, then it makes appropriate requests to the NFS using file and logical block identification semantics. The NFS performs the translation to physical block identification semantics for the device driver 220.

The SFS module 232 also performs a logical-to-physical translation for blocks assigned to tier Z 216, and asserts appropriate requests through device driver 226.

In addition to the storage tiers 210, 212, 214 and 216, the storage subsystem 128 (FIG. 1) may also have other stores not managed or referenced by either NFS module 230 or SFS module 232. These stores are identified as 218 in FIG. 2, and are controlled by corresponding device driver(s) 228. An "other filesystem" (OFS) 234 may exist above device driver(s) 228. These other stores and their controlling software modules are not important for an understanding of the invention; they are shown in FIG. 2 only to clarify that a system that makes use of the invention need not use it for all its stores; other stores which may or may not make use of the invention can co-exist in the same system with stores that do. In addition, it should be noted that a computer system can also include more than one native filesystem; in this case the SFS module 232 treats them all as a single nominal tier as explained below.

Above the three filesystems 230, 232 and 234 in the software hierarchy of FIG. 2 is the operating system 240. The operating system may for example be a Windows, Unix, Linux or VMS operating system. Above the operating system 240 are one or more application programs 242-1, 242-2 and 242-3 (representatively 242), which make calls to the operating system 240. As regards the present discussion, a useful feature of the operating system 240 is that it includes a virtual filesystem API to provide a standard filesystem interface for applications. The VFS allows applications to reference data held in any filesystem, with a common set of commands. In particular, files typically are identified by specifying a filesystem, directory path and filename, regardless of the filesystem on which it resides. The VFS implements a filesystem switch 244 which, based on the filesystem specified, routes the request to the appropriate filesystem module—in the case of FIG. 2, either the NFS module 230, the SFS module 232 or the OFS module 234. For example, if an application program makes a request to read data from a file identified by the application program as "C:\abc\def.ext", then the filesystem switch 244 knows from the 'C:\' prefix that the file is managed by the NFS module 230. Filesystem switch 244 therefore forwards the request to that filesystem module. Similarly, if an application program makes a request to read data from a file identified by the application program as "Z:\abc\def.ext", then assuming the appropriate drive letter mapping, the filesystem switch 244 knows from the 'Z:\' prefix that the file is managed by the SFS module 232. Filesystem switch 244 therefore forwards the request to that filesystem module.

Note that SFS module 232 can make calls to the operating system 240 in the same manner that applications can. Leveraging this capability, if the SFS module 232 receives a request and determines that the identified block is actually located on the NST 210, the mechanism that the SFS module 232 uses to make appropriate further requests to the NFS 230 is by calling the operating system 240, identifying the subject file as "C:\abc\def.ext". The filesystem switch 244 determines that the 'C:\' prefix designates the NFS, and forwards the further request to NFS module 230. It can be seen that if a system includes more than one NFS, the SFS module 232 can interface with each of the in the same manner, by making appropriate requests through the operating system 240.

As shown in FIG. 2, the operating system 240 also includes an OS cache 246, and the SFS module 232 includes an SFS cache 248. These caches are portions of the memory subsystem 126 (FIG. 1) in which blocks of file data, among other things, may be stored non-persistently. They are distinct from any hardware cache that might be included on the storage devices, though in an embodiment, SFS cache 246 is maintained in a separate dedicated hardware memory device. The operation of the OS cache 246 is not important for an understanding of the invention, and the operation of the SFS cache 248 is described in more detail elsewhere herein. It should be noted that so far as the operating system 240 is concerned, the SFS cache 248 is merely a portion of memory that has been allocated to the SFS module 232 in the same manner as the operating system allocates memory to application programs. So far as SFS module 232 is concerned, SFS cache 248 operates much like a cache memory for a processor, in that the most recently accessed blocks are kept in the SFS cache 248, until they age out or are otherwise flushed and written back to the appropriate persistent storage tier. SFS cache 246 in the present embodiment also contains non-persistent copies of other information, as described elsewhere herein.

Figure 3:
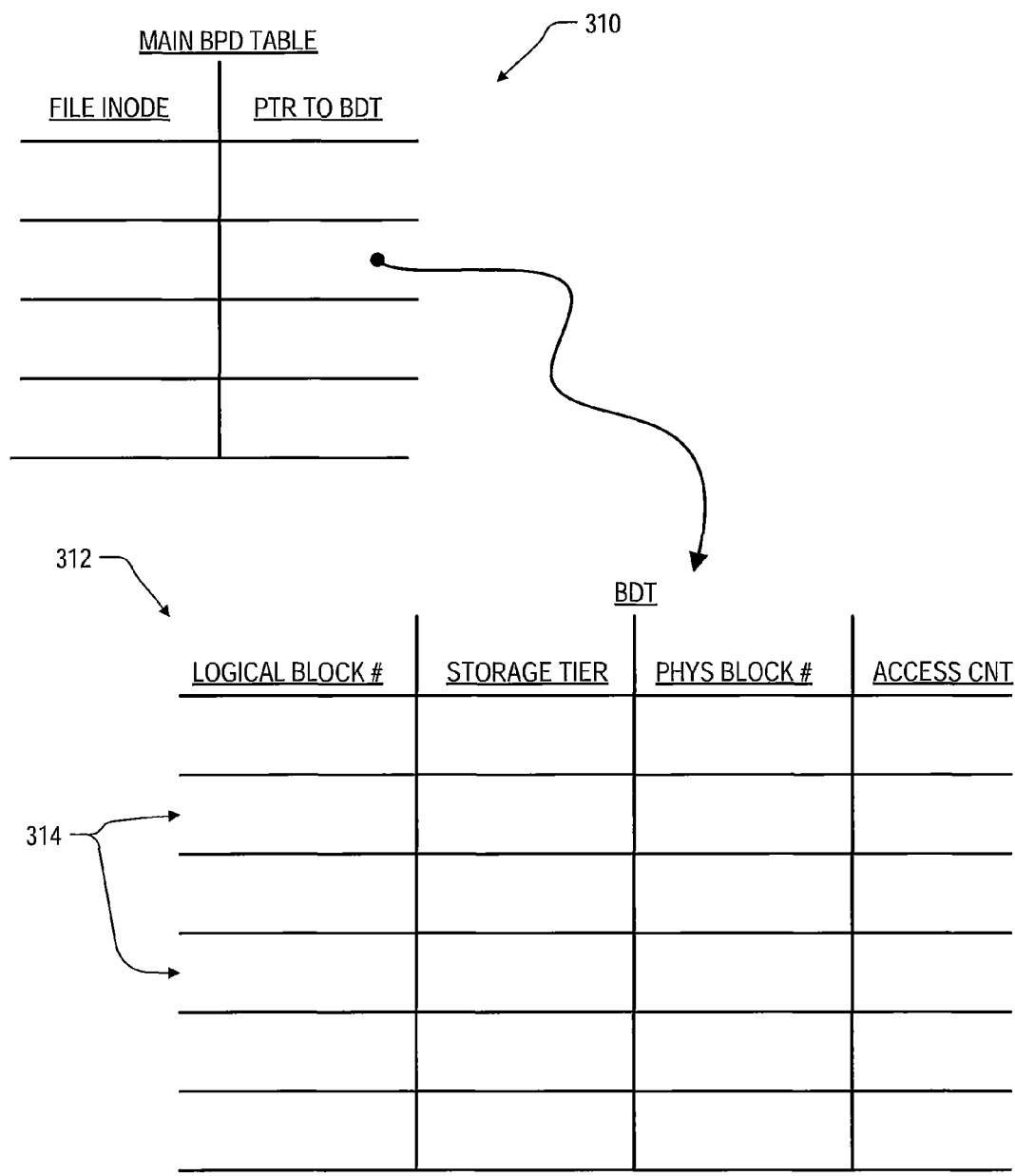
FIG. 3 illustrates the structure of the Block Promotion Database maintained by the SFS module in FIG. 2.

FIG. 3 illustrates the structure of the Block Promotion Database (BPD) database maintained by the SFS module 232 for indicating the tier to which a particular data block is assigned, and the logical to physical mapping of blocks on that tier. It comprises a main BPD table 310 which includes an entry for each file inode (as defined by the NFS) for a file that has a block descriptor table (BDT). As mentioned, only the relatively few blocks which are accessed most frequently have a BDT entry, and only those files that include a block that has a BDT entry includes a BDT at all. If the file does have a BDT, then the file has an entry in the main BPD table 310. Note that file inodes are unique only within a single filesystem. Thus in a system that has more than one native filesystem, the main BPD table includes another column which identifies to which of the native filesystems the file belongs. Alternatively, the BPD may include a separate main table for each native filesystem. Note also that whereas the main BPD table 310 is illustrated symbolically in FIG. 3 as a flat table, in a preferred embodiment it is implemented as a PLH table as described elsewhere herein.

The main BPD table 310 contains, for each file inode, a pointer to the BDT for that file. An example BDT table 312 is illustrated in FIG. 3 as well. It includes entries 314 for only the relatively few blocks of the file which are accessed most frequently. The BDT is indexed by logical block number, and for each block, it indicates the storage tier to which it is currently assigned, the physical block number on that storage tier, and an access count. Note that if the storage tier is the NST, the physical block number as indicated in the BDT entry 314 is meaningless and not used. Also, any block that has no entry in the BDT is known to be assigned to the NST and not to any of the higher storage tiers. In this way, the BPD "indicates" the tier to which all the persistently stored blocks are assigned, even those that do not have an entry in the BPD.

The BPD is itself assigned to the NST, not to any of the higher tiers. In an embodiment, each BDT 312 is itself a file, as is the main BPD table 310. The files making up the BPD database are all stored persistently in the NST, and the SFS module 232 accesses them by making standard calls to the operating system 240. A BDT entry that has been retrieved into the SFS cache 248 (or created in the SFS cache 248) remains there until its corresponding data block has been flushed from the SFS cache 248. So long as the data block was not deleted, the BDT entry is then written back to persistent NST storage. Since the SFS module 232 knows which files on the NST contain the BPD, the SFS knows that such files should be excluded from the promotion/demotion policies.

The access count field in a BDT entry is an example of what is referred to herein as a "popularity record" for the particular data block. It describes the block's popularity, at least relative to other data blocks (though it could also indicate some absolute measure of its popularity as well). Typically the popularity record identifies the block's access count within some preceding period of time, for example by deleting any popularity records that have not been recently updated. Another way to measure popularity in a particular embodiment is by read access count, i.e. without counting write accesses. Other ways to measure popularity include a file access rate, a file recent usage rate, a file access rank. Heuristics could also be used as a measure of popularity, as can other externally-applied rules. Still other ways to measure popularity in a particular embodiment will be apparent to the reader.

Process Flows

Figure 4:
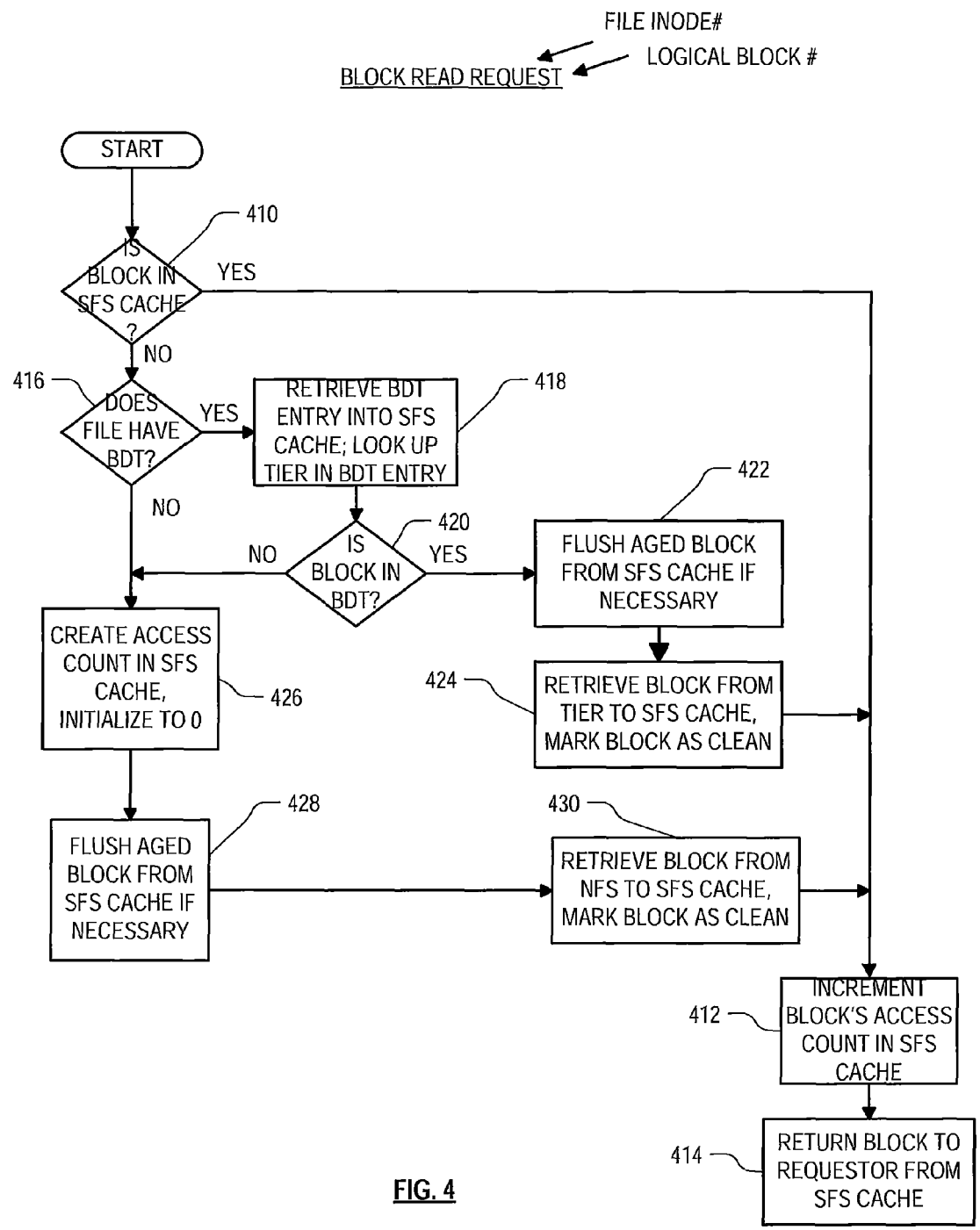
FIGS. 4-7 and 9-14 are flow charts illustrating various operations of the SFS module in FIG. 2

FIG. 4 is a flow chart illustrating the operation of the SFS module 232 in response to a request from higher level software to read data from a file. It will be appreciated that as with all flow charts set forth herein, many of the steps can be combined, performed in parallel or performed in a different sequence without affecting the functions achieved. In some cases a re-arrangement of steps will achieve the same results only if certain other changes are made as well, and in other cases a re-arrangement of steps will achieve the same results only if certain conditions are satisfied.

It can be seen that in the software hierarchy of FIG. 2, the operating system 240 is above the filesystem modules 230, 232 and 234, and the application programs 242 are above the operating system. Thus "higher level software" to the SFS module 232 includes both the operating system 240 and each of the application programs 242.

As previously mentioned, a data read request is usually presented in a way that identifies the file ID, a starting byte offset in the file, and a number of bytes to read. Before the routine of FIG. 4 is called, therefore, it has already been determined which logical block number of the specified file contains the specified starting byte offset. This is the logical block number provided to the routine of FIG. 4. Because there is a fixed mapping of logical byte addresses as presented by higher level software, and the logical block number in which it will be found, and because in the present embodiment data is read and written to persistent storage in blocks, a reference from higher level software to one or more bytes in a file is considered herein to also constitute a reference to the block(s) in which it will be found. For example, if higher level software makes a request to read a specified string of bytes from a specified file, that is considered herein to also constitute a request to read each of the blocks in the file that include one or more of the specified string of bytes.

In step 410, it is first determined whether the specified block is already in the SFS cache 248. If it is, then in step 412, the block's access count in SFS cache 248 is incremented and in step 414 the block is returned to the requestor from the SFS cache. Note that the block's access count is in a field in a BDT entry if the block has one, or if it does not, then it will be held separately in the SFS cache 248.

If in step 410 it is determined that the requested block is not in SFS cache, then in step 416 it is determined whether the file that contains the requested block, has a BDT. This determination is made by looking for the specified file inode in the main BPD table 310. If an entry is found, then the entry points to the file's BDT. In step 418 the file's BDT 312 is retrieved from the NFS into SFS cache 248 if it is not already there, and the SFS module 232 searches it for an entry for the specified logical block number. As mentioned, retrieval of a BDT from the NFS involves a standard call to the operating system 240. Note that it may not be necessary to retrieve the entire BDT 312 in step 418; the SFS module 232 often can find the desired entry, if it exists, by retrieving only one or a few blocks of the BDT 312. Also, the desired BDT entry might already be in SFS cache 248 for other reasons, such as if it is part of a contiguous group of BDT entries that had been read in previously as a group.

In step 420, it is determined whether the desired block has an entry 314 in the BDT 312. If so, then the entry 314 specifies the tier that contains the most current version of the requested data block. But before retrieving it, the SFS module 232 first determines whether the SFS cache 248 is already full. If so, then in step 422, the least recently accessed data block in SFS cache 248 is flushed from the cache as described below. Then, in step 424, the requested block is retrieved into SFS cache 248 from the tier specified in the block's BDT entry 314, and marked in the SFS cache as clean. The tier specified in the block's BDT entry 314 might be the NST 210, or any of the higher tiers 212 and 214. If the specified tier is one of the higher tiers N−1 or N−2, then the SFS module 232 retrieves the block from the indicated tier directly, without any involvement of the NFS module 230. If the specified tier is the NST 210, then the SFS module 232 forwards the request to the NFS module 230 to execute, by causing the operating system 240 to make appropriate calls to the NFS module 230 to retrieve the requested block from the NST into SFS cache 248. In either case, the routine then proceeds to step 412 for incrementing the block's access count in its BDT entry now in SFS cache 248, and to step 414 for returning the requested block to the requestor from SFS cache 248.

If in step 416 it was determined that the file containing the requested data block has no BDT, or if it does and in step 420 it was determined that the BDT has no entry for the requested data block, then the block is by default located on the NST. In step 426 a new access count is created for the block in SFS cache 248, and initialized to zero. In step 428 an aged block is flushed from the SFS cache 248 if necessary (as in step 424), and in step 430 the SFS module 232 causes the operating system 240 to make appropriate calls to the NFS module 230, to retrieve the requested block from the NST into SFS cache 248. The block is marked as clean in the SFS cache, and the routine then proceeds to step 412 for incrementing the block's access count in SFS cache 248, and to step 414 for returning the requested block to the requestor from SFS cache 248. Note that the block's access count is maintained separately in the SFS cache 248 because no BDT entry has yet been created for this data block.

Figure 11:
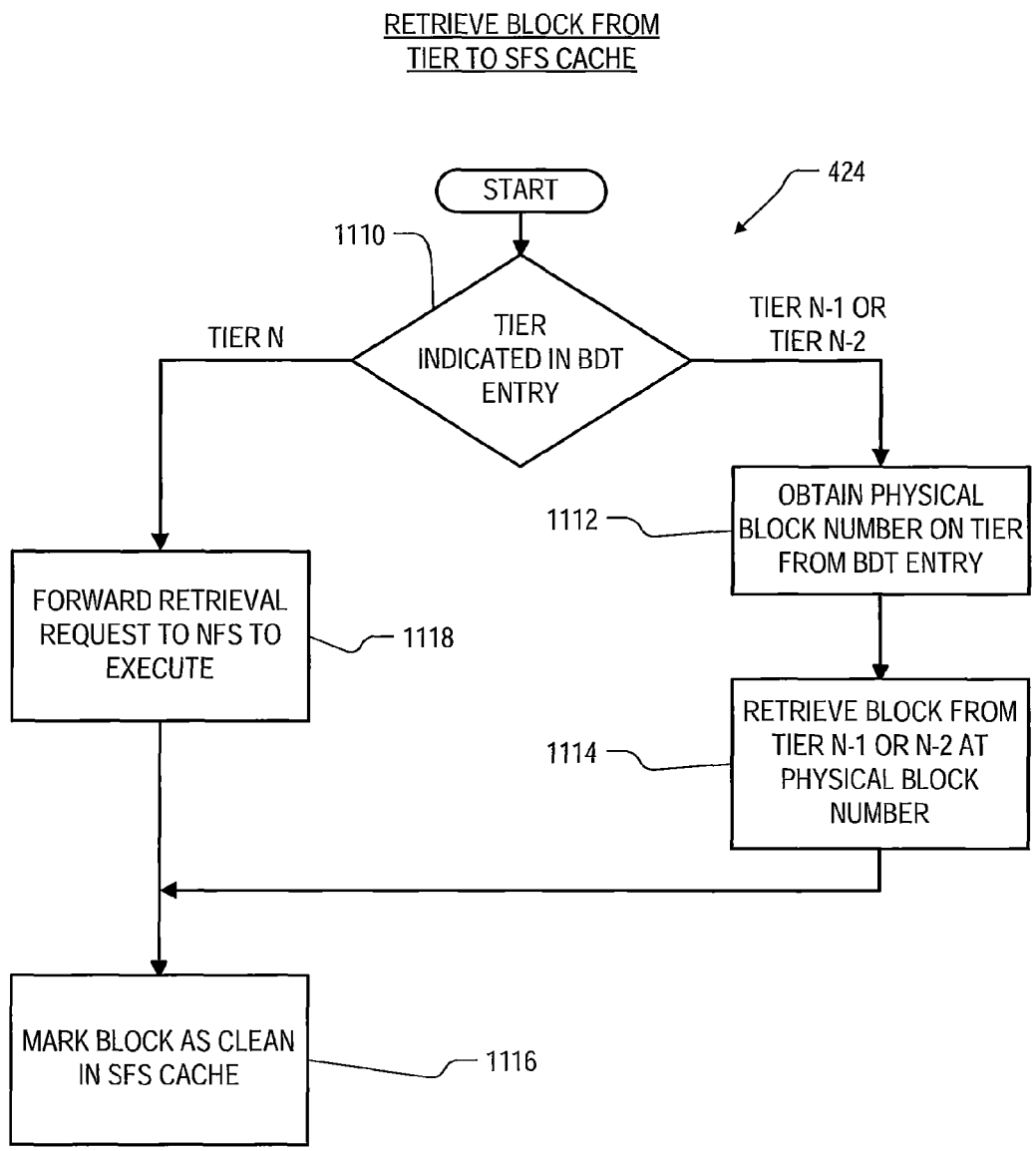

FIG. 11 is a flow chart detail of the step 424 in FIG. 4 for retrieving the requested block from the tier specified in the BDT entry. In step 1110, the SFS module 232 first consults the BDT entry for the requested block to determine the tier in which it is stored. If it is in one of the higher level tiers N−1 or N−2, then even though the file ID with which the caller identifies the file within which the requested block resides is a file ID defined by the NFS, the logical-to-physical block mapping for the requested block is maintained by the SFS module 232. Thus in step 1112, the SFS module 232 obtains the physical block number of the block on the tier from the block's BDT entry. It then retrieves the indicated physical block from the indicated tier (step 1114). On the other hand, if in step 1110 the SFS module 232 determines from the BDT entry that the requested block is stored in the NST 210, then the logical-to-physical block mapping for this block is maintained by the NFS module 230. Accordingly, in step 1118, the SFS module 232 forwards the request to the NFS module 230 to execute, by causing the operating system 240 to make appropriate calls to the NFS module 230 to retrieve the requested block from the NST into SFS cache 248. In either case, in conjunction with the retrieval of the requested block into SFS cache 248, the SFS module 232 marks the block as clean in SFS cache 248 (step 1116).

SFS cache 248 is in some ways similar to a conventional memory cache for a processor, in that for the writing of data into a block that is in the SFS cache 248, it supports both write-back and write-through variants. The write-through variant is used for writes or blocks which have been identified for "direct I/O", meaning there should be no postponement of writes to persistent storage. Direct I/O can be specified in at least three ways. In one way, the entire filesystem is identified as requiring direct I/O at the time the filesystem is mounted. Such a filesystem leaves all caching to the application. While the application might make use of features of the present invention, in the present embodiment it bypasses the SFS entirely and is therefore not described further herein.

A second way that blocks can be identified for direct I/O is upon file open; in this case direct I/O has been specified for all blocks within the file. A third way is as part of the command to write data to the block; in this case the particular write to the particular data block is identified as direct I/O, but other writes to the same data block might not require direct I/O. The third way can be thought of as a "forced write-through".

Figure 5:
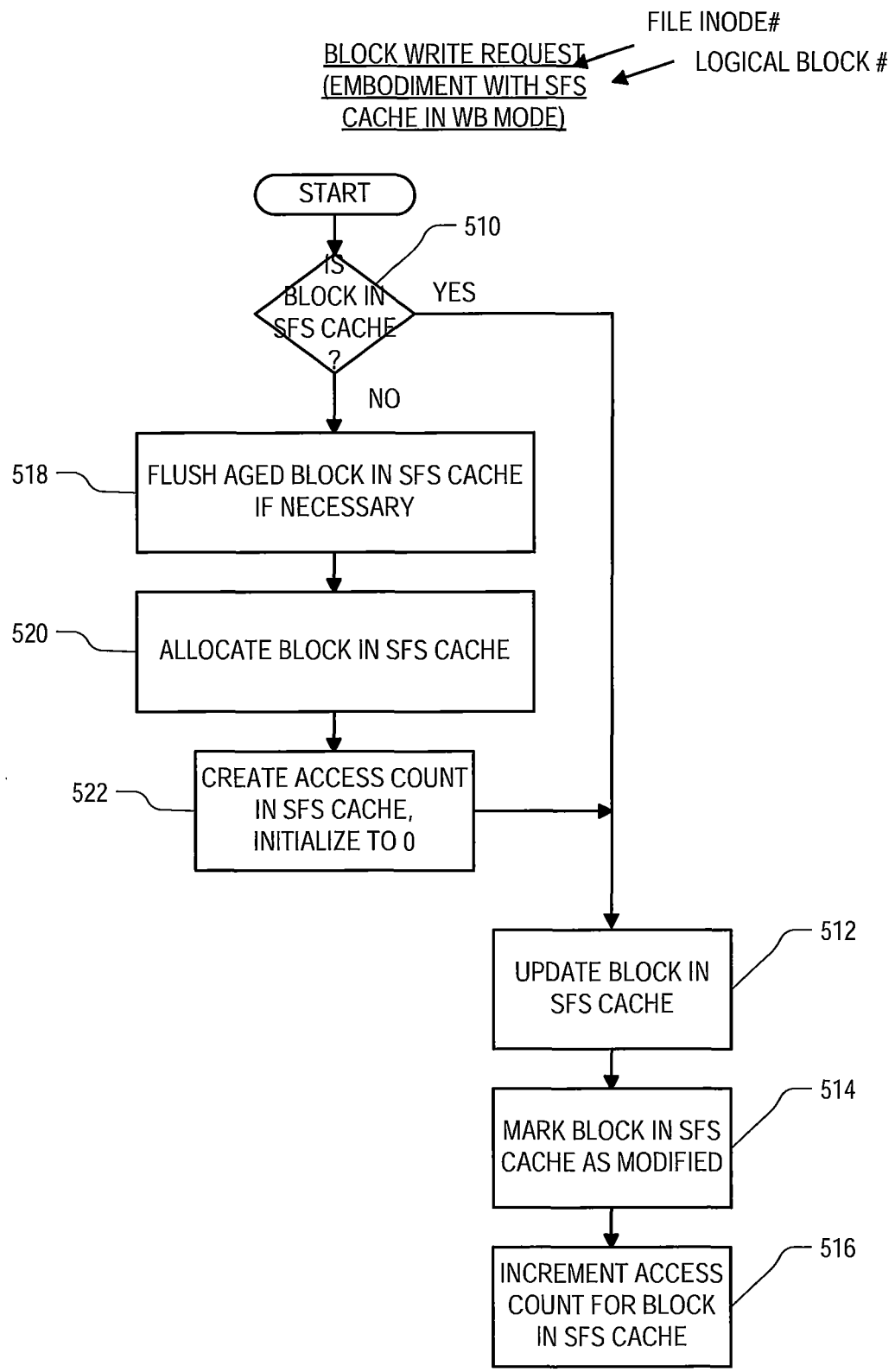

FIG. 5 is a flow chart of a routine in the SFS module 232 for handling a block write request in write-back mode (i.e. neither the block nor the write request requires direct I/O). As with FIG. 4, if the call specified only a file ID and a byte offset and length, then prior to the routine of FIG. 5, the logical block number containing the specified data segment has already been determined.

In FIG. 5, in step 510, it is first determined whether the data block is already in SFS cache 248. If it is, then in step 512 the block is updated in SFS cache. In step 514 it is marked as modified in SFS cache, and in step 516 the block's access count in SFS cache 248 is incremented. If the block has a BDT entry, then it would be present in the SFS cache 248 and is incremented there. If not, then the block would have a separate use count which is incremented in SFS cache 248. In either case, the updated access count is not at this time written to persistent storage.

If in step 510 it was determined that the designated block is not currently in SFS cache, then space is allocated for it in step 520. Before that, however, in step 518 an aged block in SFS cache is flushed if necessary, similarly to steps 422 and 428 in FIG. 4. In step 522 a separate access count is created in the SFS cache 248 for the block, and initialized to zero. No BDT entry is yet created. The routine then picks up at step 512 for updating the block in SFS cache 248, marking it modified, and incrementing the access count for the block.

Figure 6:
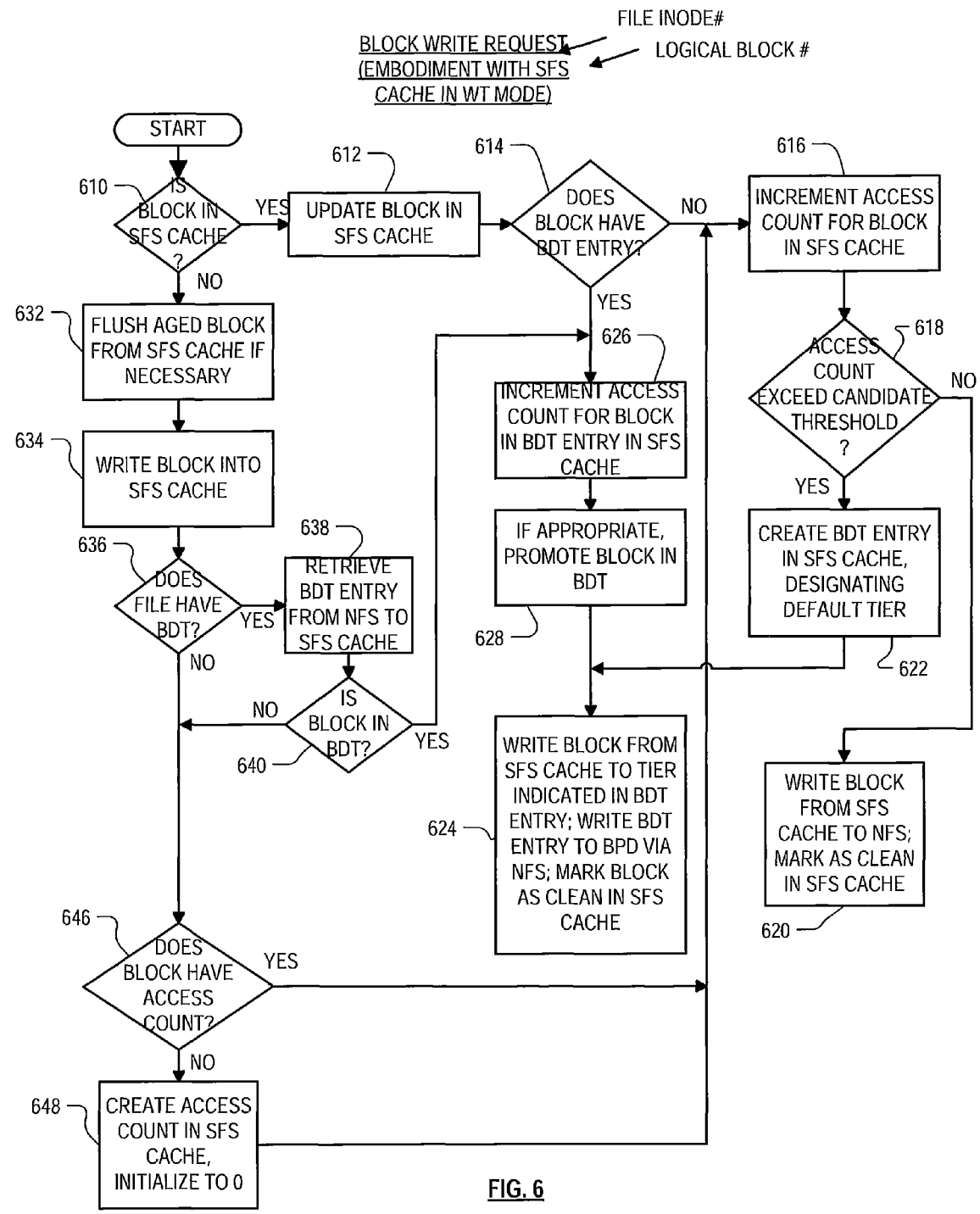

FIG. 6 is a flow chart of a routine in the SFS module 232 for handling a block write request in write-through mode (i.e. either the block or the write request called for direct I/O). As with FIGS. 4 and 5, if the call specified only a file ID and a byte offset and length, then prior to the routine of FIG. 6, the logical block number containing the specified data segment has already been determined.

In step 610, it is first determined whether the designated block is present in SFS cache 248. If so, then the block is updated in SFS cache 248 (step 612). In step 614 the SFS module 232 then determines whether the block has a BDT entry. If not, then in step 616 the separate access count for the block in the SFS cache 248 is incremented. In step 618, it is determined whether the access count has now achieved the threshold to begin tracking it as a candidate for promotion. If not, then in step 620 the block is simply written from SFS cache 248 to its assigned storage tier and marked as clean in SFS cache 248. Given that the block has no BDT entry, the assigned storage tier is NST 210, and the write is performed through the NFS module 230 via appropriate calls from SFS module 232 to the operating system 240.

If in step 618 it was determined that the block's access count does now exceed the threshold to begin tracking it as a candidate for promotion, then in step 622 a BDT entry is created for it in SFS cache 248. The current access count is copied into the new BDT entry and its separate copy in the SFS cache 248 is deleted. Initially, the new BDT entry designates NST 210 as the block's assigned tier, since the block has not yet been promoted to any higher tier. Then, in step 624, the data block is written from SFS cache 248 to NST 210 and marked as clean in SFS cache 248. Additionally, because the block now has an access count worth preserving, the new BDT entry is also written to the BPD. This might also involve creation of a new BDT if no other block in the file already has a BDT entry. Again, the data writes to the NST 210 of both the data block and the BDT entry are performed through the NFS module 230 via appropriate calls from SFS module 232 to the operating system 240.

If in step 614 it was determined that the block to be written does have a BDT entry, then in step 626 the access count for the block is incremented in the BDT entry in SFS cache 248. Before writing the block to persistent storage in step 624, though, in step 628 it is first determined whether the block should be promoted to a higher tier than currently indicated in the BDT entry. This process is described elsewhere herein, but if promotion is indicated, then in step 628 it involves writing the higher tier number into the storage tier field of the BDT entry 314 in SFS cache 248. The BDT entry is then written to the NST 210 in step 624, in conjunction with the writing of the block to the tier now designated in the BDT entry 314. The block is also marked as clean in the SFS cache 248. Note that the writing of a block to a tier other than NST 210 may also involve updating a linked list referenced by the tier superblock, which is described hereinafter.

Returning to step 610, if it was determined that the designated block is not in SFS cache 248, then in step 634 it is written into the SFS cache. Before that however, as in similar steps in other flow charts, in step 632 an aged block is flushed from the SFS cache 248 if necessary to make space for the new block.

In step 636 it is determined whether the file that contains the designated block, has a BDT. This determination is made in the same way as in step 416 (FIG. 4), by looking for a corresponding entry in the main BPD table 310. If an entry is found, then file's BDT 312 is retrieved from the NFS into SFS cache 248 if it is not already there, and the SFS module 232 searches it for an entry for the specified logical block number. Again, it may not be necessary to retrieve the entire BDT 312 in step 638. In step 640, it is determined whether the designated block has an entry 314 in the BDT 312. If so, then the routine proceeds to step 626 for incrementing the access count in the BDT entry in SFS cache, promoting the block if appropriate, writing the block and the BDT entry to their appropriate tiers of persistent storage, and marking the block as clean in SFS cache.

If in step 636 it was determined that the file containing the designated data block has no BDT, or if it does and in step 640 it was determined that the BDT has no entry for the designated data block, then the block is by default assigned to the NST 210. In step 646 it is determined whether the block yet has even a separate access count in SFS cache 248. If not, then in step 648 one is created in SFS cache 248 and initialized to zero. Either way, the routine then proceeds to step 616 for incrementing the access count in SFS cache, creating a BDT entry in SFS cache if the block is now a candidate for future promotion, and writing the data block and (if one has been created) the BDT entry, to the appropriate tier(s) of persistent storage. The block is marked clean in SFS cache 248.

Figure 12:
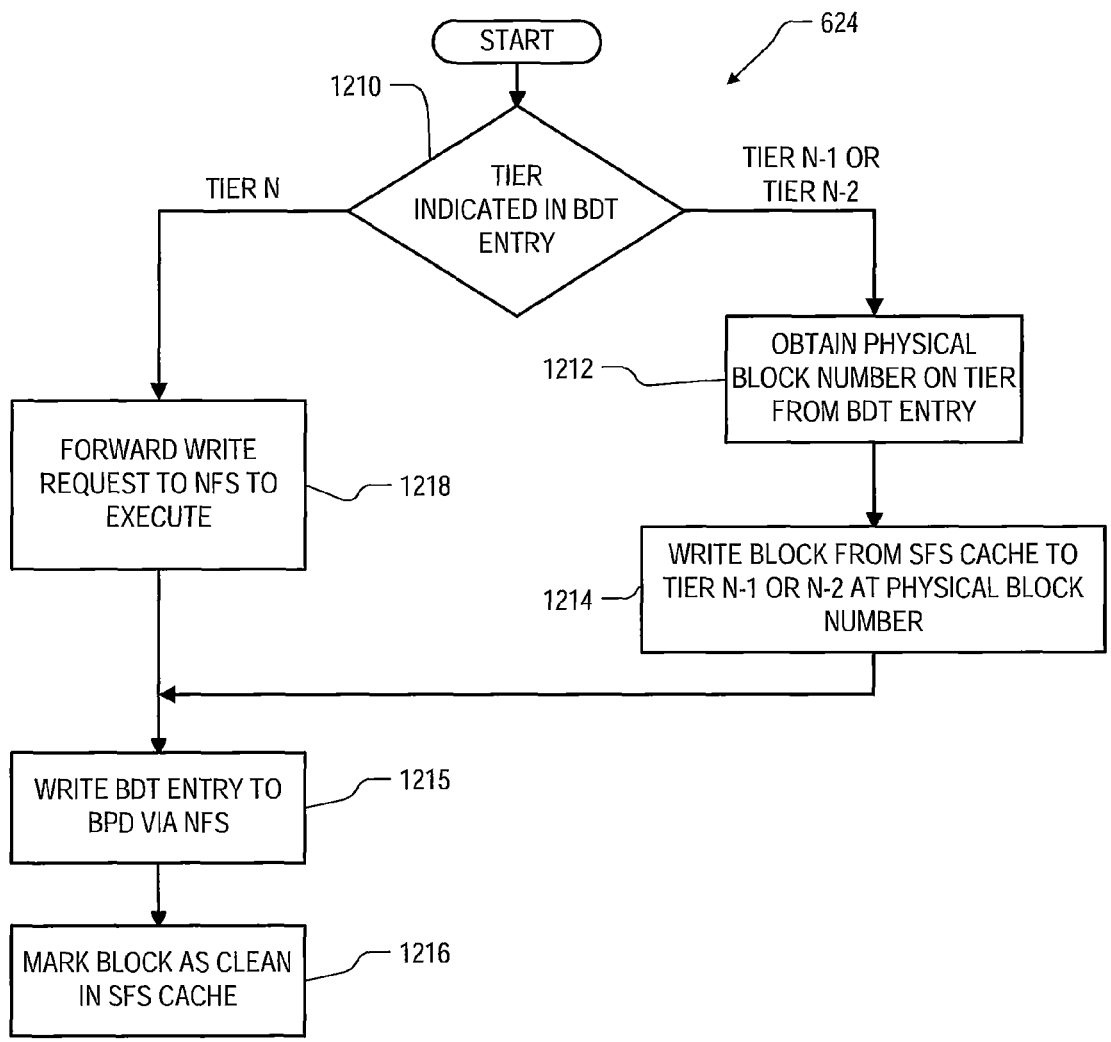

FIG. 12 is a flow chart detail of the step 624 in FIG. 6 for writing the data block from SFS cache 248 to the tier specified in the BDT entry. In step 1210, the SFS module 232 first consults the BDT entry for the block being written, to determine the tier in which it is stored. If it is in one of the higher level tiers N−1 or N−2, then even though the file ID with which the caller identifies the file within which the provided block resides is a file ID defined by the NFS, the logical-to-physical block mapping for the block is maintained by the SFS module 232. Thus in step 1212, the SFS module 232 obtains the physical block number of the block on the tier from the block's BDT entry. In step 1214 it then writes the provided data to the indicated physical block on the indicated tier. On the other hand, if in step 1210 the SFS module 232 determines from the BDT entry that the provided block is stored in the NST 210, then the logical-to-physical block mapping for this block is maintained by the NFS module 230. Accordingly, in step 1218, the SFS module 232 forwards the write request to the NFS module 230 to execute, by causing the operating system 240 to make appropriate calls to the NFS module 230 to write the provided data block from the SFS cache 248 into the NST. In either case, in conjunction with the writing of the provided block into persistent storage, the SFS module 232 also writes the BDT entry to the BPD via the NFS module 230 (step 1215) and marks the block as clean in SFS cache 248 (step 1216).

Figure 7:
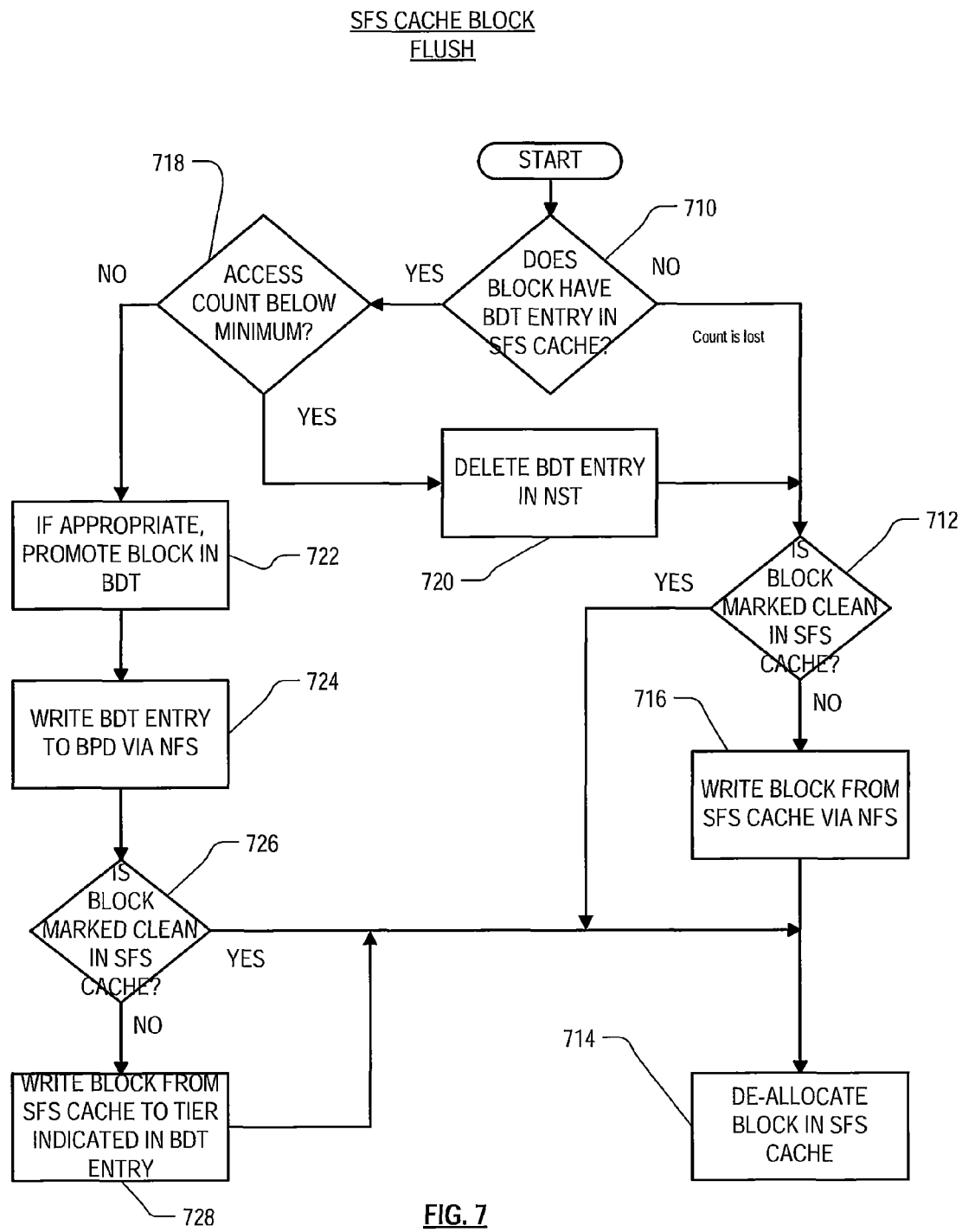

FIG. 7 is a flow chart detail of each of steps 422, 428, 518 and 632, for flushing an aged block from SFS cache. The steps of FIG. 7 can also be triggered by other events, such as on file close or a forced flush for any reason. Regardless of how the flush is triggered, the trigger is considered herein to constitute a command or instruction to perform the flush.

In step 710, the SFS module 232 first determines whether the block to flushed has a BDT entry in the SFS cache 248. If not, then the count will be lost when the block is flushed. Additionally, it is also known that the block is assigned to the NST 210. In step 712, it is determined whether the block is marked clean in the SFS cache. If so, then in step 714 the block is simply de-allocated in the SFS cache 248 without having to write anything to persistent storage. If the block was marked modified in step 712, then in step 716 the block is written from the SFS cache 248 to the NST 210. As mentioned, the data write to the NST 210 is performed through the NFS module 230 via appropriate calls from SFS module 232 to the operating system 240.

If in step 710 it was determined that the block to be flushed does have a BDT entry in SFS cache, then in step 718 it is next determined whether the access count of the block as indicated in the BDT entry, is below a minimum threshold required for maintaining it. That is, it is determined whether the block is no longer a candidate for promotion out of the NST 210. This could occur if, for example, after the BDT entry was created, the minimum threshold required for maintaining it evolved upward with other access counts in the storage system and accesses of the subject block have not kept up in frequency. This could occur either after the block has been demoted back down to the NST 210 or before it was ever promoted out of the NST 210. If the access count has fallen below the minimum, then in step 720 the BDT entry is deleted both in SFS cache 248 and in persistent storage in the NST 210. The routine then continues at step 712 for writing the block from SFS cache 248 to NST 210 unless it is marked clean, and de-allocating the block in SFS cache 248.

If in step 718 it was determined that access count is not below the minimum threshold required for maintaining the BDT, then in step 722, if appropriate, the block is promoted in the BDT entry. As for step 628 (FIG. 6), this process is described elsewhere herein, but if promotion is indicated, then in step 718 it involves writing the higher tier number into the storage tier field of the BDT entry 314 in SFS cache 248. In step 724 the BDT entry (with or without an updated tier assignment) is written to the BPD in NST 210, or in SFS cache 248 if present there. In step 726 it is determined whether the block being flushed is marked as clean in the SFS cache 248, and if so, then in step 714 it is simply de-allocated in SFS cache 248. If it is marked modified, then in step 728 it is first written to persistent storage at the tier indicated in the BDT entry 314 before the block is de-allocated in SFS cache 248 step 714. Again, note that writing of a block to a tier other than the NST 210 might involve updating a linked list referenced by the tier superblock, which is described hereinafter.

The access count of a block being flushed is not incremented as a result of the flush, because a flush does not reflect the block's usage pattern as it is not initiated by an application.

Figure 13:
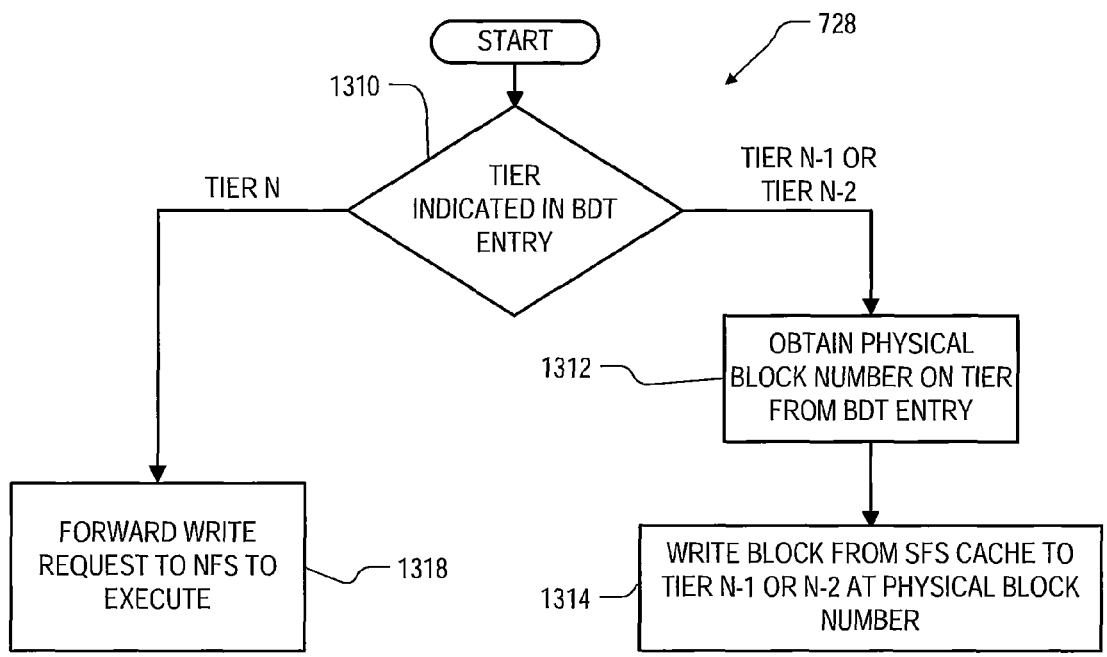

FIG. 13 is a flow chart detail of the step 728 in FIG. 7 for writing the data block from SFS cache 248 to the tier specified in the BDT entry. In step 1310, the SFS module 232 first consults the BDT entry for the block being flushed, to determine the tier in which it is stored. If it is in one of the higher level tiers N−1 or N−2, then even though the file ID with which the file within which the data block resides is identified by a file ID defined by the NFS, the logical-to-physical block mapping for the block is maintained by the SFS module 232. Thus in step 1312, the SFS module 232 obtains the physical block number of the block on the tier from the block's BDT entry. In step 1314 it then writes the data block being flushed to the indicated physical block on the indicated tier. On the other hand, if in step 1310 the SFS module 232 determines from the BDT entry that the provided block is stored in the NST 210, then the logical-to-physical block mapping for this block is maintained by the NFS module 230. Accordingly, in step 1318, the SFS module 232 forwards the write request to the NFS module 230 to execute, by causing the operating system 240 to make appropriate calls to the NFS module 230 to write the provided data block from the SFS cache 248 into the NST.

Promotion and Demotion

Before describing block promotion and demotion, it will be useful to describe the tier superblock and associated data structures that are present on each tier of persistent storage, higher than NST 210. FIG. 8 illustrates some of these structures. As mentioned, each tier above NST 210 includes a tier super block stored at physical block number 0 and also replicated at several locations across the tier. In FIG. 8, tier super block 810 includes an entry for the total capacity of the tier, a count of the number of free blocks, and a pointer to the head of a linked list of free blocks (the "free list"). It also includes pointers to the head and tail of a doubly linked list of the blocks in use on the tier, in non-decreasing order of their access counts. The BDT entries for the blocks at the head and tail of the list contain the lowest and highest access counts of all the blocks in the tier, and those two values are used in a preferred embodiment to calculate the access count threshold that a new block must have in order to be promoted into the tier.

Structure 812 illustrates the doubly linked list pointed to by the tier superblock. As can be seen, each entry in this list includes fields identifying the physical block number of the block on the subject tier, the file ID and logical block number of the block (and an identification of the nominal filesystem within which the file ID is defined, if the system has more than one), pointers to the next and previous entries in the list, and a flag indicating whether the block is currently in SFS cache 248. It will be appreciated that when blocks are written or flushed back into one of the higher tiers 212 and 214 of persistent storage, updated access counts may be written to the tier as well. Any such writing step therefore also includes a step of updating the linked list 812 to reflect the new access counts. Similarly, promotion of a block into a tier will involve creating an entry for the block in the linked list 812 and linking it in at the appropriate position inside the list, and deleting a block from the tier will involve deleting its entry in the linked list 812 and updating the links before and after. Demoting a block out of the tier will involve only updating the head pointer in the super block 810, since as will be seen, the block that is demoted in the present embodiment is the one with the lowest access count.

Note that the SFS also has other configuration information not stored in a tier super block. Such information might be stored in a configuration or initialization file, for example. Such information includes the access count needed to create a BDT entry, the access count below which to delete a BDT entry, and a staleness threshold at which to delete an entire BDT file as no longer indicating current popularity. To the extent these values are not fixed in a particular embodiment, the SFS module 232 can keep them in memory. Note also that there is no tier super block 810 for the NST 210, at least not one managed or consulted by the SFS module 232.

Figure 9:
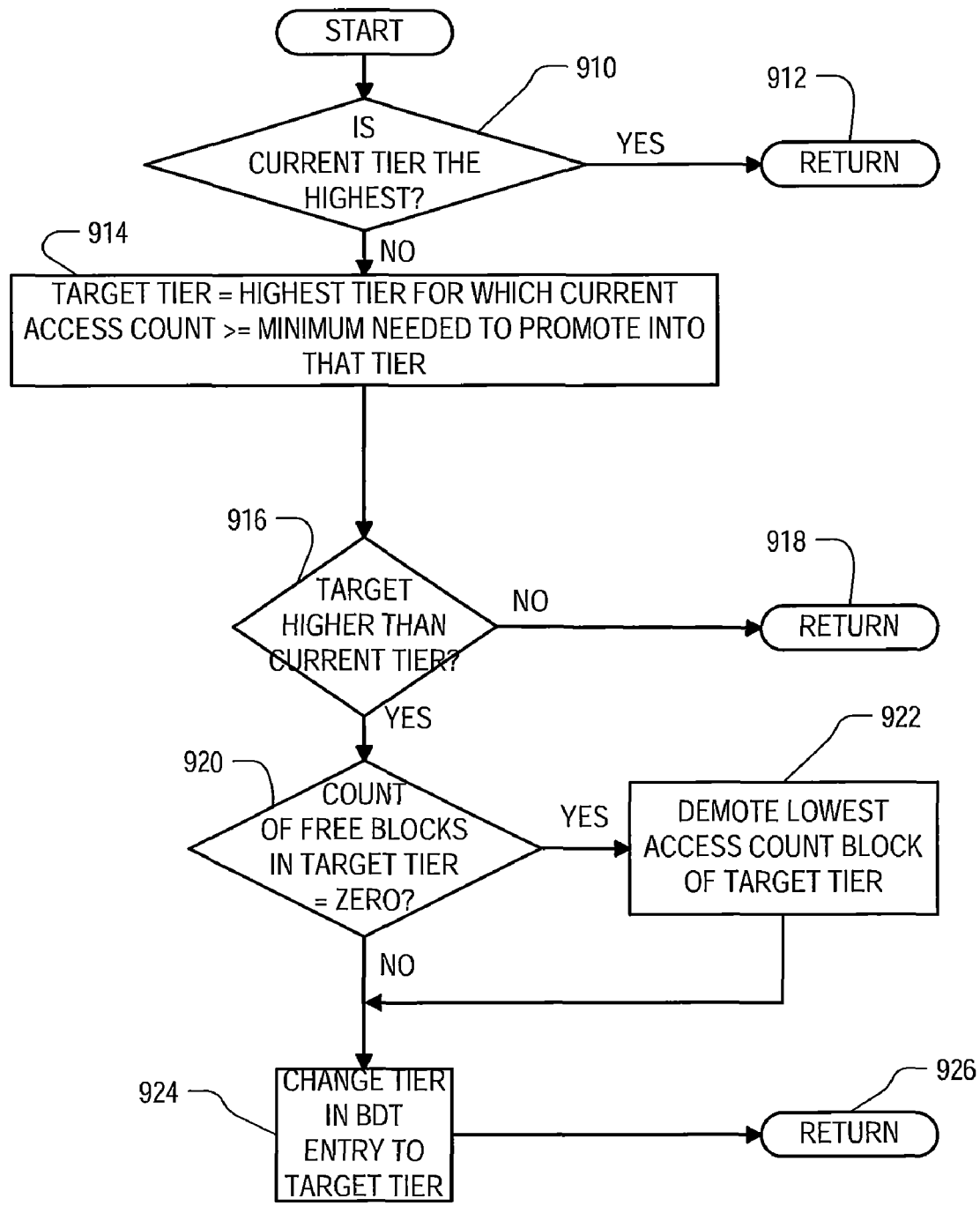

FIG. 9 is a flow chart detail of each of steps 628 and 722, for promoting a block in the BDT if appropriate. In the present embodiment, blocks are considered for promotion to a higher tier only at the time they are being written back to persistent storage—e.g. on a write-through or on flushing of an aged block which is cached in a modified state in SFS cache 248. Referring to FIG. 9, in step 910, it is first determined whether the block is already assigned to the highest tier. If so, then nothing is changed and the routine returns (step 912).

If higher tiers exist, then in step 914, the target tier which is appropriate for the block being written, is determined. In general, a block is eligible for promotion into a particular tier if its access count exceeds a minimum threshold established for that tier to receive promotions. Preferably these thresholds are not fixed, but rather evolve in step with the general increase in access counts over time in the storage subsystem. For example, in one embodiment, the minimum threshold is merely any access count equal to or higher than the lowest access count of any block currently in the tier. This formulation risks thrashing, however, with blocks being demoted out of the tier very shortly after they were promoted in. Preferably, therefore, the minimum threshold is an access count that exceeds the lowest access count of any block currently in the tier, plus a delta. Since blocks are demoted from the lowest access counts in the tier, the delta introduces some delay time for a block recently promoted in. The delta can be a fixed number in some embodiments, or it can vary depending on other access counts. In a preferred embodiment, the threshold is defined as the average, or a weighted average, of the lowest and highest access counts of all the blocks in the tier. The lowest and highest access counts of all the blocks in the tier are obtained from the BDT entries of the blocks pointed to by the head and tail pointers in the tier superblock 810, and the weighting factor can be fixed or set as a configuration variable. In an embodiment, the weighting factor is set to give 10% weight to the highest access count in the tier and 90% weight to the lowest access count. Other methods of calculating the threshold will be apparent to the reader. In addition, in some embodiments the calculations can be different for different tiers.

Note that the target tier for a block being promoted might not be the tier immediately above its current tier; the block may have been accessed so frequently while in SFS cache 248 that it should jump by two or more tiers. Thus in step 914, the target tier is calculated as the highest tier for which the current access count of the block equals or exceeds the minimum count needed to promote a block into that tier.

In step 916, it is determined whether the calculated target tier is higher than the block's current tier. If not, then in step 918 nothing is changed and the routine returns.

If the target tier is higher, then the block will be promoted. But if the target tier is already full, then another block must first be demoted. Thus in step 920, SFS module 232 determines whether the target tier is full. It makes this determination by consulting the count of free blocks in the tier super block 810 as previously described. If this count equals zero, then in step 922, the SFS module 232 identifies a block having the lowest access count of all blocks currently in the target tier and demotes it. A block having the lowest access count currently in the target tier can be found as the block pointed to by the linked list head pointer in the tier super block 810. The details of the demotion step are described below. In another embodiment, demotion of a block can be triggered when the target tier is almost full, rather than completely full, for example if it is desired to maintain a margin for safety or other purposes.

In step 924, whether or not it was necessary to demote a block out of the target tier, the routine now changes the tier number in the BDT entry for the block being promoted, to the target tier calculated in step 914. The actual writing of the data block to that tier is discussed in FIG. 6 or 7, as the case may be. Note that if a block is being promoted out of any current tier which is higher than the NST 210, the SFS module 232 will also de-allocate the block from the current tier and make it available for future promotions from lower tiers. Preferably the SFS module 232 does not de-allocate the block in the nominal tier 210 when it is promoted to one of the higher tiers, however. The NFS module 230 is not even notified that one of its blocks have been promoted. By retaining the block allocation on the NST 210, the NFS retains all of its metadata pertaining to the block and the file to which it belongs. Additionally, space is assured on the NST 210 if and when the block is demoted back into the NST 210. Still further, most native filesystems do not easily support deleting an arbitrary block from the middle of a file; typically they support creating a file with an initial allocation of blocks, adding more blocks to the end, and truncating blocks from the end, but not deleting blocks from the beginning or middle of a file.

After the tier number in the BDT entry has been changed, the routine returns (step 926).

Figure 10:
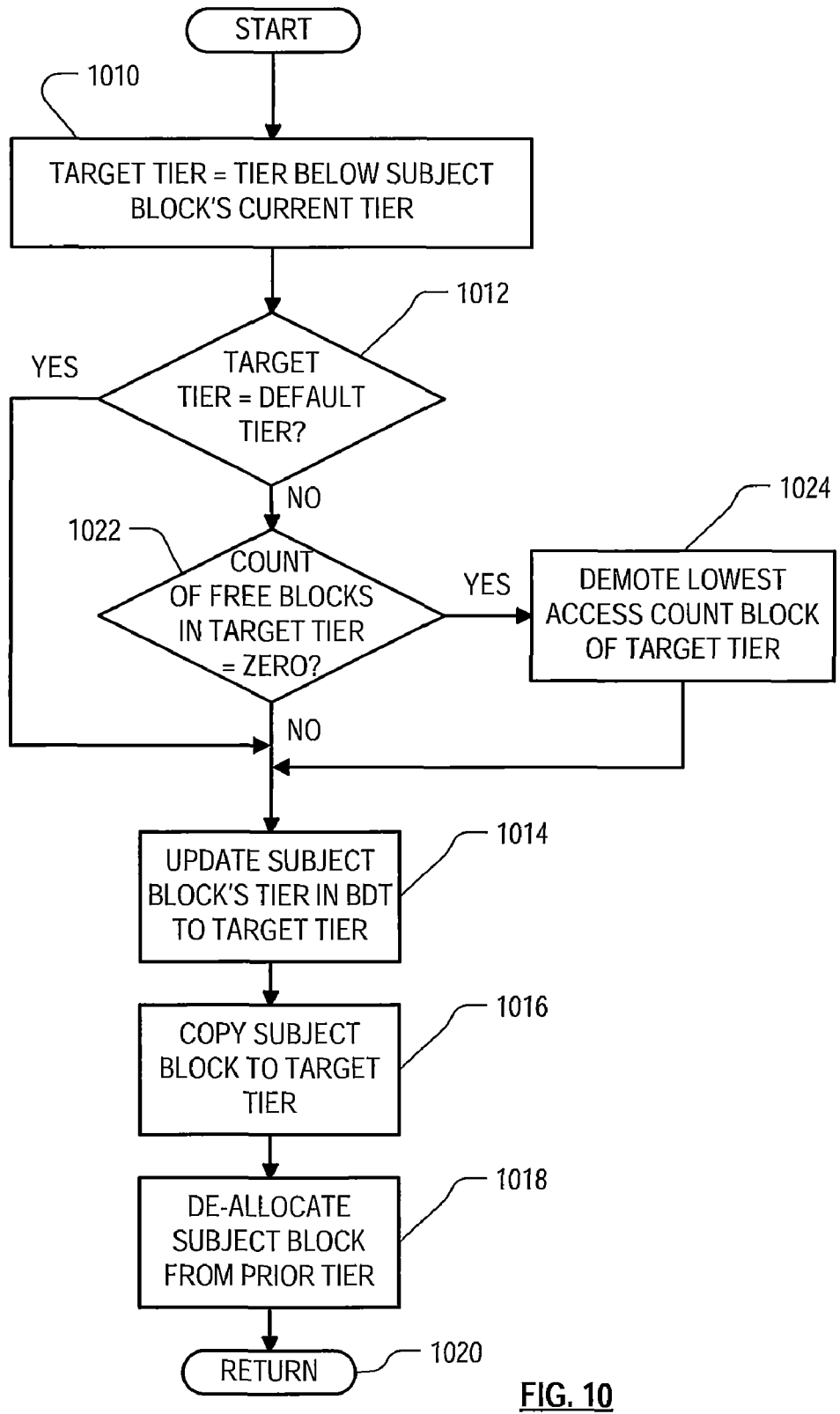

FIG. 10 is a flow chart detail of step 922 in FIG. 9, for demoting the lowest access count block of the target tier of a block promotion. Note that the block being demoted must currently be assigned to one of the higher tiers 212 and 214; this routine is never called if the block is currently assigned to the NST 210.

In step 1010, a new target tier is calculated for the demotion. In the embodiment of FIG. 10, the target tier is always the one immediately below the block's current tier. In another embodiment, a block can be demoted by more than one tier at a time if appropriate. In step 1012, it is determined whether the target tier for the block being demoted is the nominal tier 210. If it is, then there is no need for the SFS module 232 to concern itself with the availability of space for the demoted block since as previously described, the block had never been de-allocated on the nominal tier 210. In addition, the NFS module 230 is responsible for handling any out-of-space issues on the NST 210. Thus in step 1014 the SFS module 232 updates the subject block's tier as specified in its BDT, to designate the target tier (in this case NST 210). The block is then copied from its prior tier to the target tier in step 1016, and in step 1018 it is de-allocated from the prior tier to make room for another block being promoted. The routine then returns (step 1020).

Note that preferably the BDT entry for the demoted block is not deleted at this time, since it still may remain a candidate for subsequent re-promotion. Even if the block's access count falls below the minimum required to retain the BDT entry, in one embodiment the entry is still not deleted immediately since a block being demoted might not be in SFS cache 248. Thus the BDT entry also might not be in SFS cache, and deleting the entry would require retrieving, changing and re-writing BPD information from and to the NST 210. Rather, the instruction to delete the BDT entry is instead retained in a delayed update list held in the SFS cache 248 until the next time the file containing the block is opened and its BDT retrieved into memory.

If in step 1012 it is determined that the target tier for demotion is not the nominal tier 210, then in step 1022 it is determined whether sufficient space exists in the target tier for the block. This is determined by consulting the count of free blocks in the target tier super block, and determining whether the count is zero. If not (i.e. if there is available space in the target tier), then the routine continues to step 1014 described above.

If in step 1022 it is determined that the target tier for demotion is already full, then in step 1024 the routine makes a recursive call to the routine of FIG. 10 to demote the lowest access count block of the target tier to yet a lower tier. When done, the routine continues to step 1014 described above.

Figure 14:
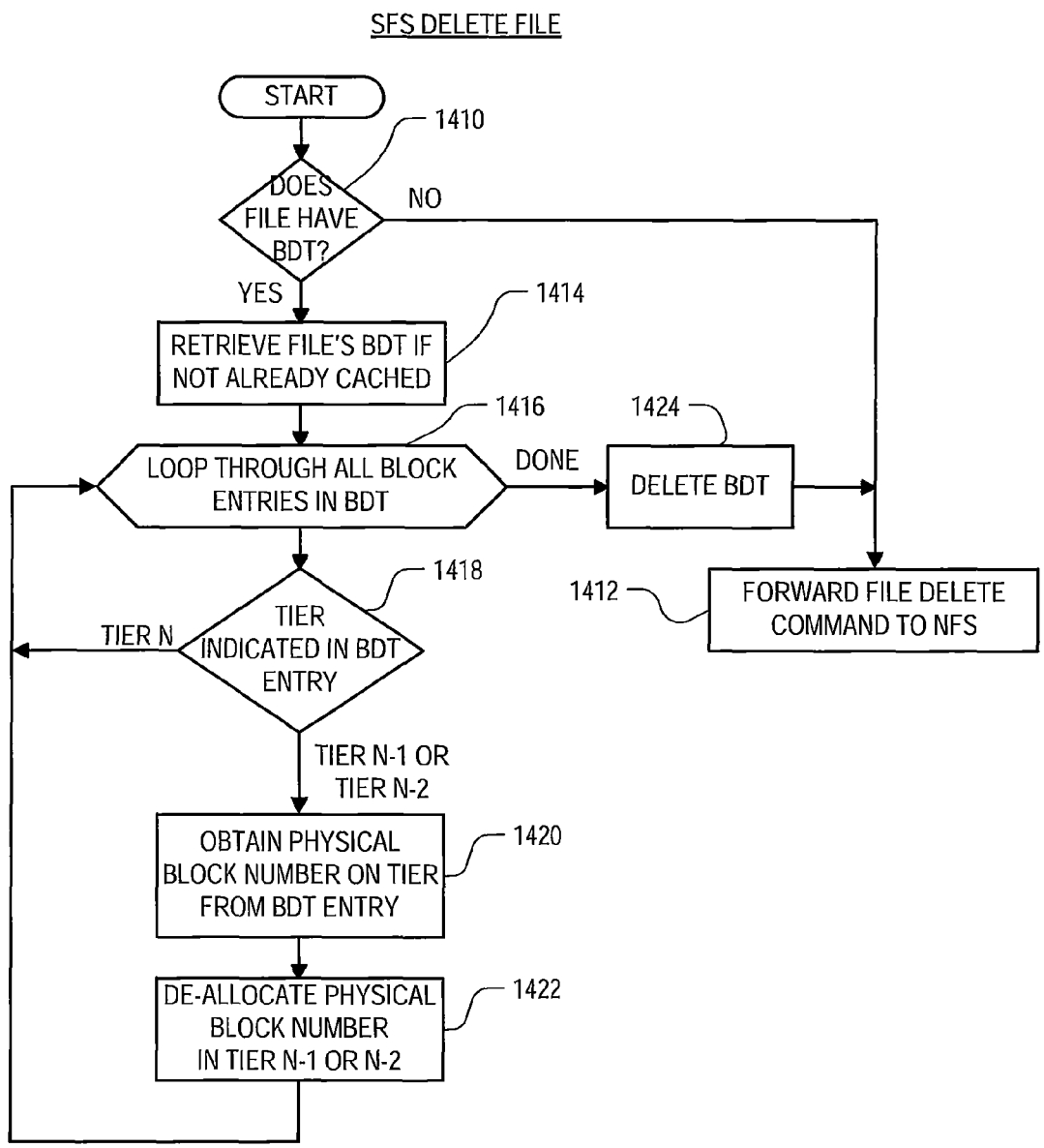

FIG. 14 is a flow chart of a routine in the SFS module 232 for handling a request to delete a file. In step 1410 it is first determined whether the indicated file has a BDT. If not, then all the blocks of the file are known to be assigned to the NST. Therefore, in step 1412, the SFS module 232 forwards the file delete command to the NFS 230 in the manner previously described. The NFS 230 then deletes the file in a conventional manner.

If in step 1410 it was determined that the indicated file does have a BDT, then there is a possibility that one or more of the blocks in the file are currently assigned to higher tiers. Since the NFS 230 is not aware of the higher tiers, merely forwarding the command to the NFS 230 will not de-allocate those blocks of the file. Accordingly, in step 1414, the SFS 232 retrieves the BDT of the specified file (if it is not already cached in memory). In step 1416, the SFS 232 begins a loop through all block entries in the BDT.

In step 1418, the SFS 232 switches on the tier to which the current block in the loop is assigned. The tier is read from the current BDT entry in the loop. If the block is assigned to the NST, then nothing special need be done in the higher tiers, and the routine loops back to step 1416 to consider the next BDT entry. If in step 1418 the SFS 232 determines that the current block in the loop is assigned to one of the higher tiers, then in step 1420 the SFS 232 obtains the physical block number of the block on the tier. Again, the physical block number is obtained from the current BDT entry since the BDT maintains the logical-to-physical block mapping for blocks in the file which have been assigned to the higher tiers. In step 1422 the SFS 232 de-allocates the physical block number from the block's currently assigned tier, and loops back to step 1416 to consider the next BDT entry. De-allocation of a physical block on the tier involves moving the physical block number from the double linked list in the tier superblock 810 to the free list in the tier superblock 810.

After all entries in the BDT have been considered, then in step 1424 the SFS 232 deletes the BDT. The routine then forwards the file delete command to NFS 230 to handle. The NFS deletes the file from the NST and updates its directory listings or other logical-to-physical file mappings in a conventional manner. Deletion of the file by the NFS 230 includes de-allocating all of the file's blocks on the NST, including the ones that had been promoted to a higher tier, since as previously mentioned the SFS 232 did not de-allocate any blocks from the NST when they were promoted to a higher tier. Versions of such blocks (typically older versions) remain in the NST and are de-allocated by the NFS 230 in the conventional manner. This step is performed by the NFS 230 rather than the SFS 232 since, also as mentioned, it is the NFS 230 which manages the logical-to-physical block mapping of blocks of the file that are stored on the NST.

Integrated Filesystem Embodiment

Figure 15:
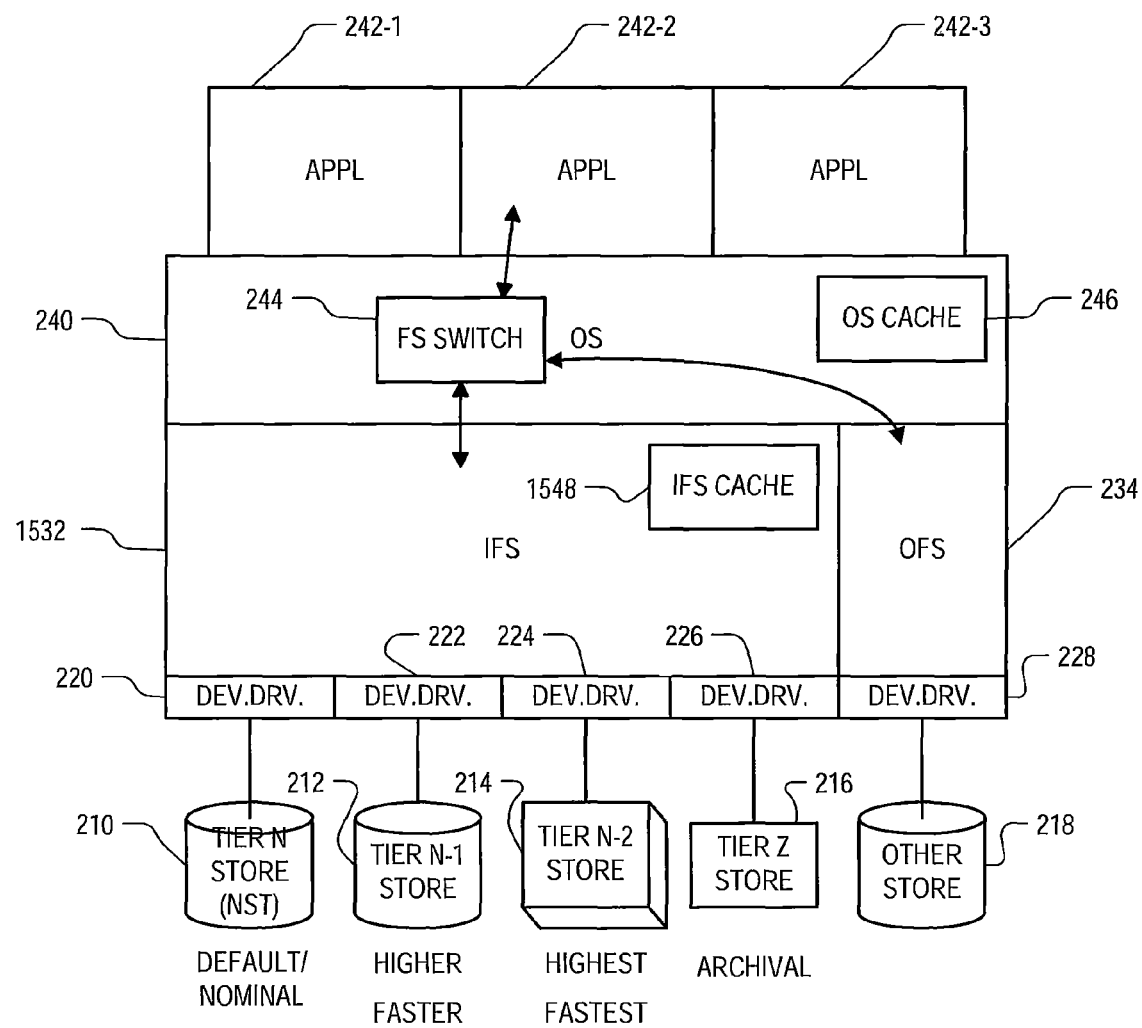
FIG. 15 illustrates the overall software architecture of a second embodiment of a system incorporating features of the invention.

In the embodiments above, a conventional NFS 230 is retained to control the NST 210 while the SFS 232 is added to control the higher level storage tiers and to control the NST 210 through the NFS 230. FIG. 15 illustrates an embodiment in which a single filesystem controls all the tiers, including the NST 210.

Referring to FIG. 15, all the modules are the same as in FIG. 2 except there is no NFS 230 or SFS 232, and instead an integrated file system (IFS) 1532 is present which combines both. An IFS cache 1548 is also present which performs many of the functions of SFS cache 248 as previously described. The IFS 1532 can be based on a conventional filesystem module, and can support many or all of the API calls that can be made by higher level software to a conventional filesystem module. In particular the IFS 1532 exposes a single unified filesystem to higher level software, defines the namespace for all files in all the tiers 210, 212 and 214, and maintains the mapping of logical blocks in each file as exposed to higher level software, to physical blocks on all the various tiers. IFS 1532 promotes and demotes blocks of a file among tiers 210, 212 and 214 at block granularity, so that different blocks of a single file can be assigned to different ones of the tiers.

Figure 16:
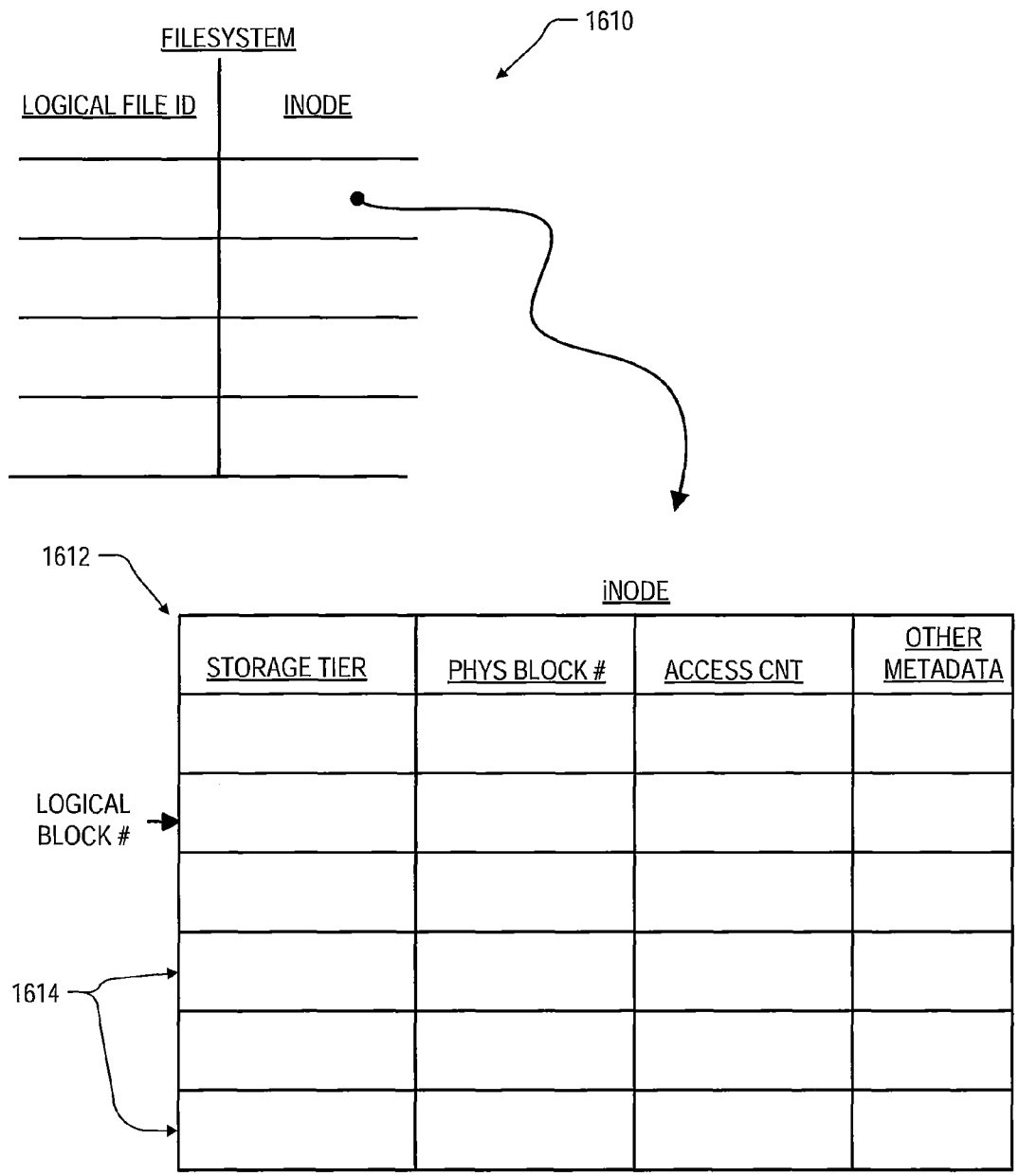
FIG. 16 illustrates aspects of the structure of an Inode in the second embodiment.

In the embodiment of FIG. 15, no separate BPD is needed. Instead, the access counts and the mapping of logical-to-physical block numbers can all be stored in the Inode for the file. FIG. 16 illustrates pertinent structures in the IFS. They include a main filesystem structure 1610 which translates a logical file identifier to an Inode number. The logical file identifier may include, for example, a directory path and filename, and the Inode number is unique within the IFS 1532. This structure may be conventional, and may or may not take the form of a simple table as shown in FIG. 16.

Each Inode number identified in the main filesystem table identifies a respective Inode table such as table 1612 in FIG. 16. Table 1612 contains an entry 1614 for each logical block in the file. The table is indexed by the logical block number within the file, and each entry indicates, among other things, the storage tier where the block is currently assigned, the physical block number of the block on that tier, and a popularity measure (such as an access count) for the block. Unlike in the BPD 310, all blocks in all files in the filesystem have an access count which is persistent at least after the block is first written to persistent storage, and the mapping of all blocks in all files in the filesystem to physical blocks on persistent storage is maintained by and known to the IFS 1532, including those blocks assigned to the NST 210.

Figure 17:
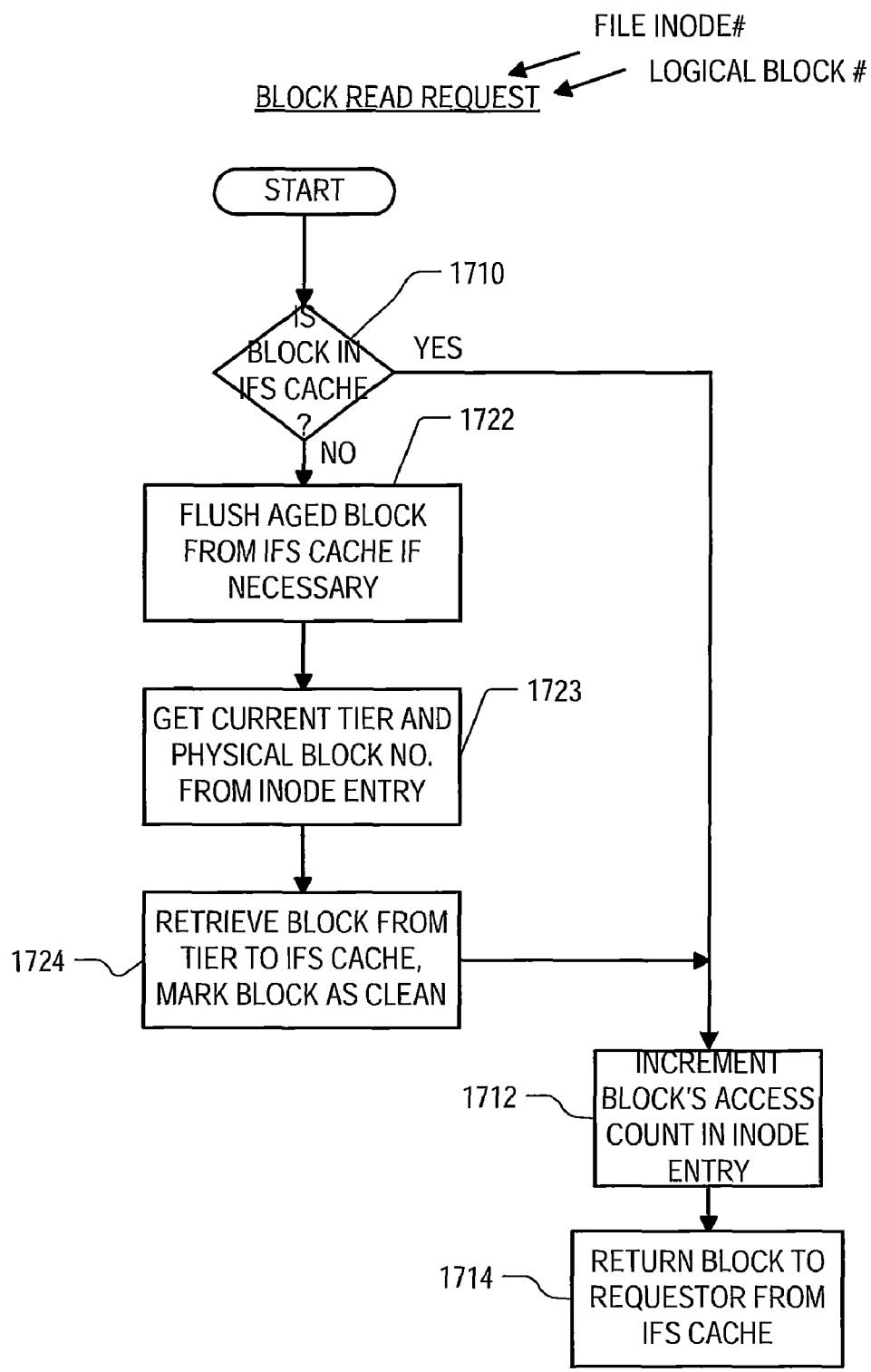
FIGS. 17-22 are flow charts illustrating various operations of the IFS module in FIG. 15.

FIG. 17 is a flow chart illustrating the operation of the IFS module 1532 in response to a request from higher level software to read data from a file. Again, before the routine of FIG. 17 is called, it has already been determined which logical block number of the specified file contains the specified starting byte offset. This is the logical block number provided to the routine of FIG. 17. In step 1710, it is first determined whether the specified block is already in the IFS cache 1548. If it is, then in step 1712, the block's access count in IFS cache 1548 is incremented and in step 1714 the block is returned to the requestor from the IFS cache. Note that the block's access count is in a field in the file's Inode, the file containing which is cached in memory in a conventional manner.

If in step 1710 it is determined that the requested block is not in IFS cache, then in step 1722, the least recently accessed data block in IFS cache 1548 is flushed from the cache as described below with respect to FIG. 20. In step 1723, the currently assigned tier and physical block number for the specified block are obtained from the block's entry in the file's Inode, and in step 1724, the requested block is retrieved into IFS cache 1548 from the indicated block number on the indicated tier. The block is marked in the IFS cache as clean. The tier specified in the block's entry 1614 might be any of the tiers 210, 212 or 214; IFS 1532 treats them all alike in this respect. The routine then proceeds to step 1712 for incrementing the block's access count in its Inode entry 1614, and to step 1714 for returning the requested block to the requestor from IFS cache 1548.

Figure 18:
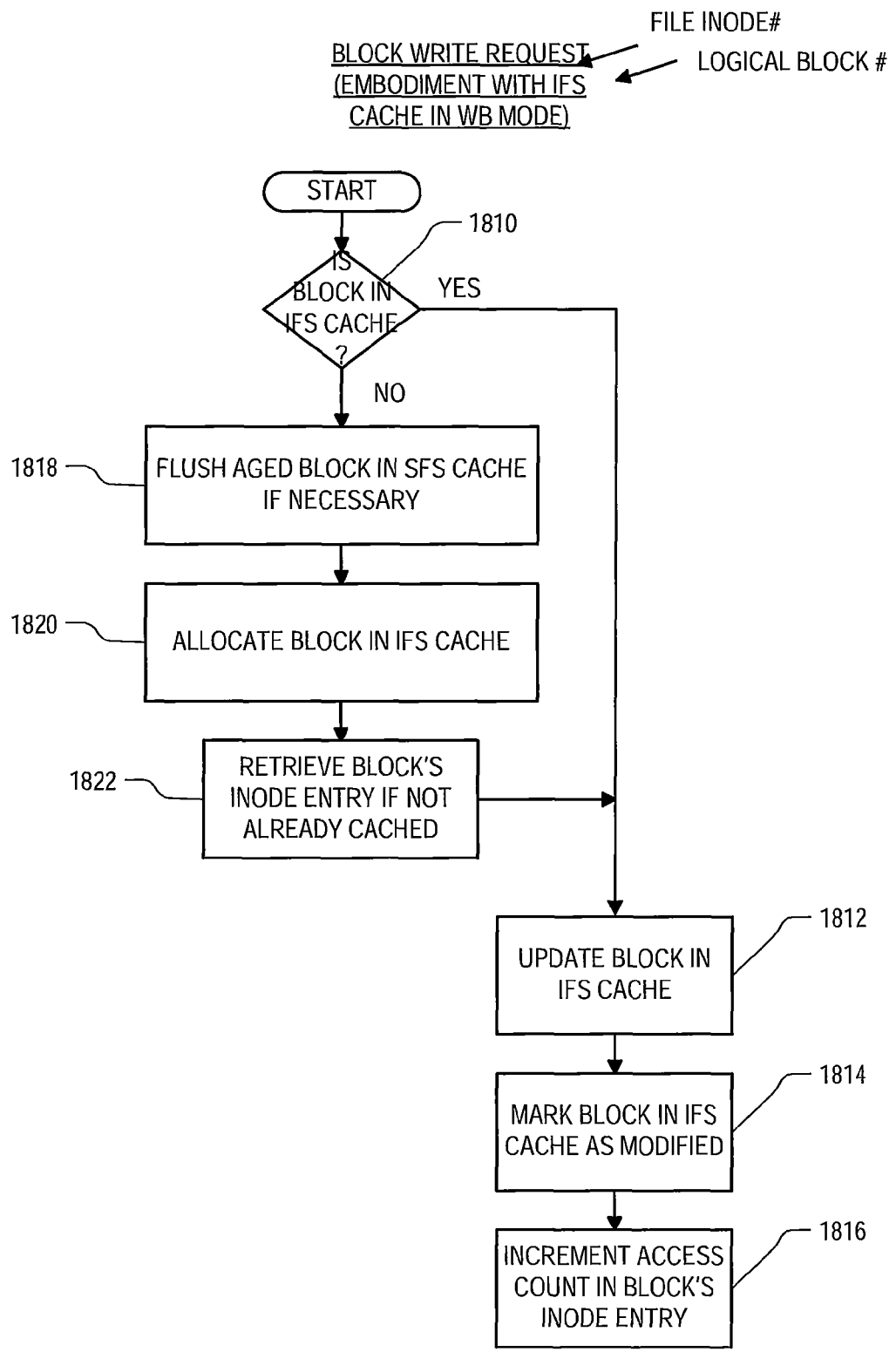

FIG. 18 is a flow chart of a routine in the IFS module 1532 for handling a block write request in write-back mode. Prior to the routine of FIG. 18, the logical block number containing the specified data segment has already been determined.

In FIG. 18, in step 1810, it is first determined whether the data block is already in IFS cache 1548. If it is, then in step 1812 the block is updated in IFS cache. In step 1814 it is marked as modified in IFS cache, and in step 1816 the block's access count in the block's Inode entry 1614 is incremented. If the Inode table is cached, then the updated access count is not yet written to persistent storage.

If in step 1810 it was determined that the designated block is not currently in IFS cache, then space is allocated for it in step 1820. Before that, in step 1818 an aged block in IFS cache is flushed if necessary, as described with respect to FIG. 20. In step 1822 the block's Inode entry 1614 is retrieved and cached in memory if it is not already there. The routine then picks up at step 1812 for updating the block in IFS cache 1548, marking it modified, and incrementing the access count for the block in the block's Inode entry.

Figure 19:
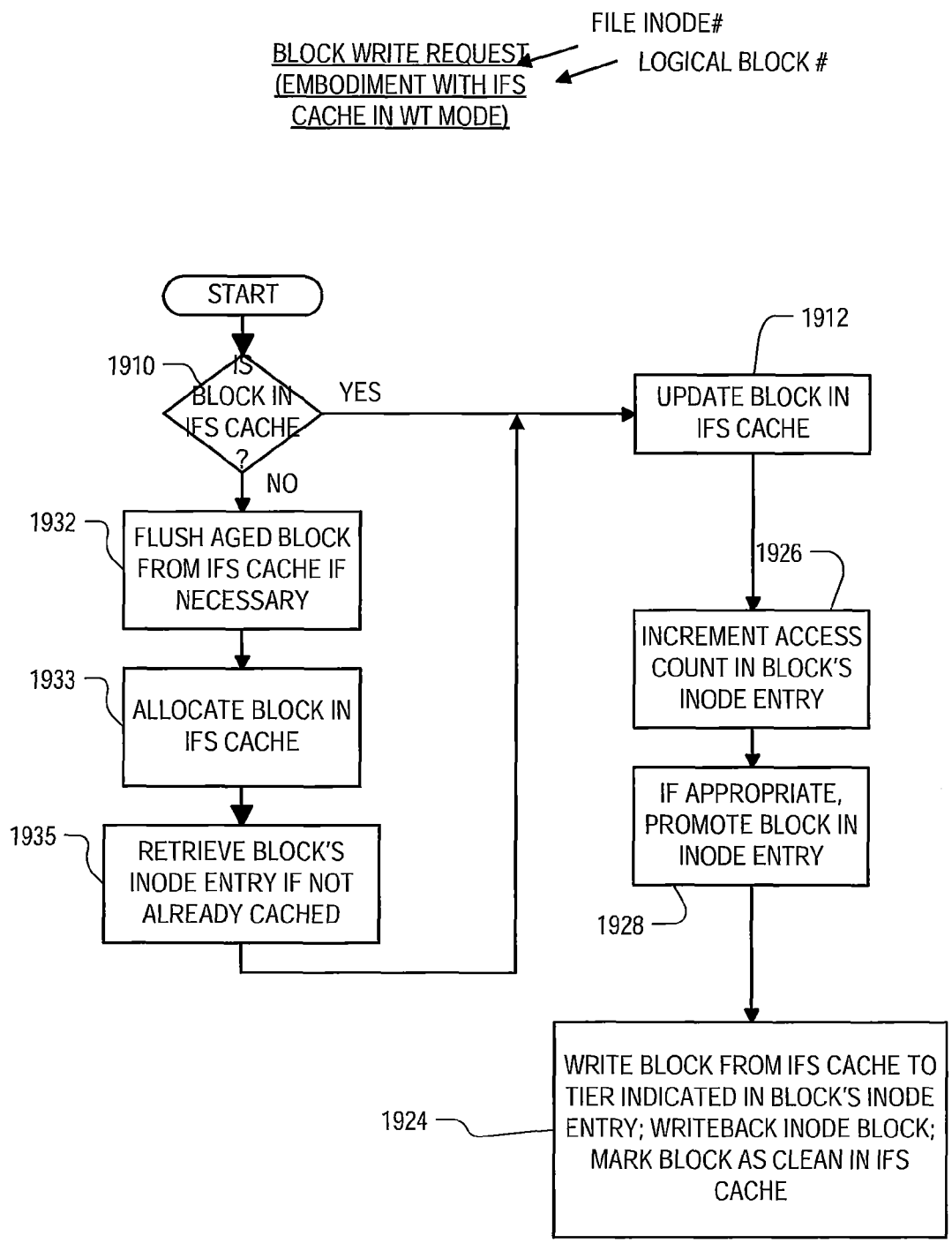

FIG. 19 is a flow chart of a routine in the IFS module 1532 for handling a block write request in write-through mode. In step 1910, it is first determined whether the designated block is present in IFS cache 1548. If so, then the block is updated in IFS cache 1548 (step 1912). In step 1922 the access count for the block in its Inode entry 1614 is incremented in IFS cache 1548. Before writing the block to persistent storage in step 1924, though, in step 1928 it is determined whether the block should be promoted to a higher tier than currently indicated in the block's Inode entry. This process is described elsewhere herein, but if promotion is indicated, then in step 1928 it involves writing the higher tier number into the storage tier field of the block's Inode entry 1614 in IFS cache 1548. The Inode entry 1614 is then written back to the NST 210 in step 1924, in conjunction with the writing of the block to the tier now designated in the block's Inode entry 1614. The block is also marked as clean in the IFS cache 1548.

Returning to step 1910, if it was determined that the designated block is not in IFS cache 1548, then in step 1932 an aged block is flushed from the IFS cache 1548 if necessary to make space for the new block. In step 1933 a block is allocated in IFS cache 1548, and the block's Inode entry 1614 is also retrieved into memory in step 1935 if not already cached there. The routine then proceeds to step 1912 for writing the provided block data into the allocated block in IFS cache 1548, incrementing the access count in the block's Inode entry in IFS cache, promoting the block if appropriate, writing the block and the Inode entry to their appropriate tiers of persistent storage, and marking the block as clean in IFS cache.

Figure 20:
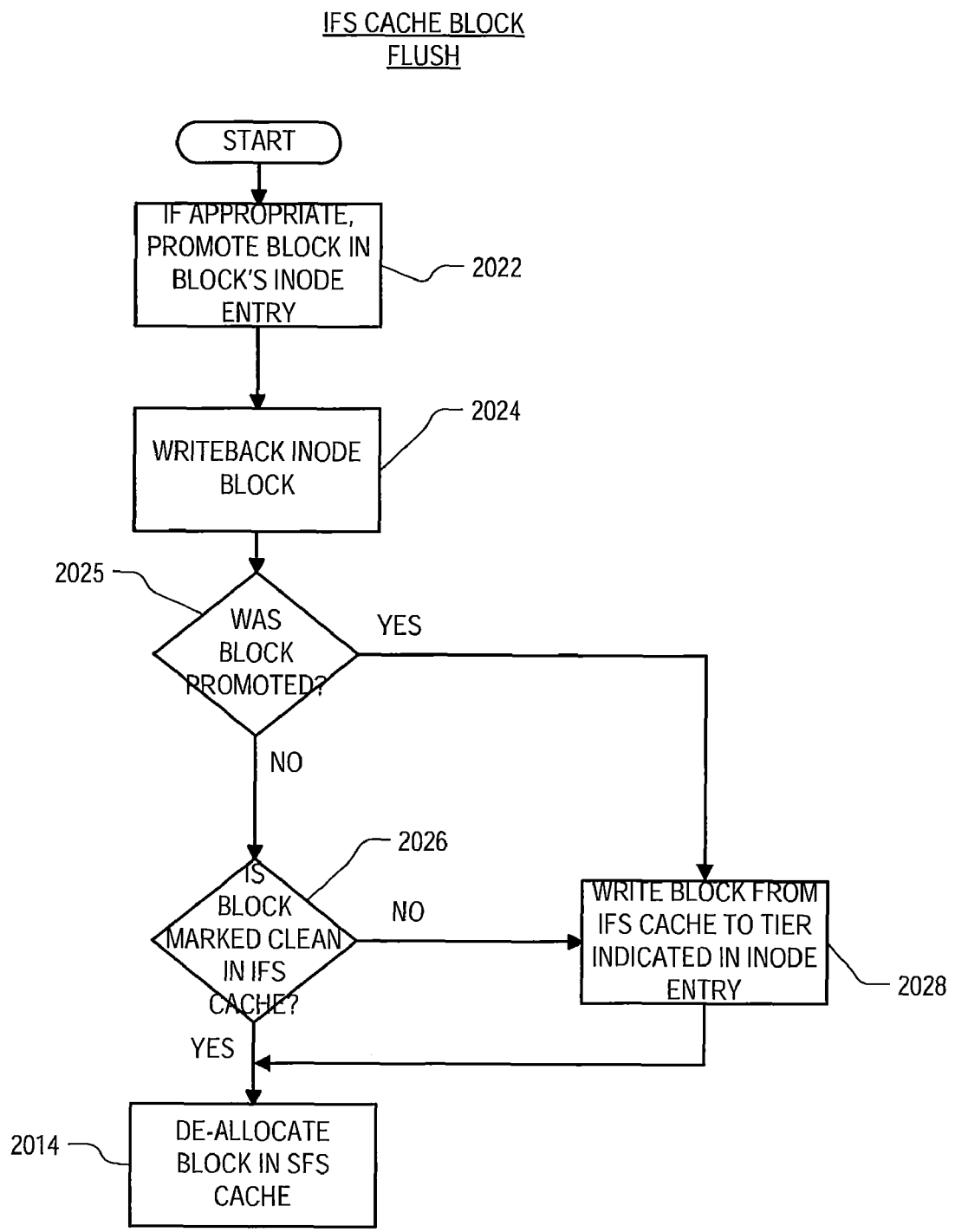

FIG. 20 is a flow chart detail of each of steps 1722, 1818 and 1932, for flushing an aged block from IFS cache. In step 2022, if appropriate, the block is promoted in the block's Inode entry 1614. In step 2024 the Inode entry 1614 (with or without an updated tier assignment) is written back to persistent storage. Unlike the SFS embodiment, the current access count is not lost even if it would have been too small, in the SFS embodiment, to create a BDT record. In step 2025 it is determined whether the block was promoted in step 2022. If not, then in step 2026 it is determined whether the block being flushed is marked as clean in the IFS cache 1548. If so, then in step 2014 the block is simply de-allocated in IFS cache 1548. If the block was marked modified in IFS cache 1548 (step 2026), or if the block had been promoted (step 2025), then in step 2028 the block is written to persistent storage at the tier indicated in the Inode entry 1614. Whether or not a write to persistent storage was required, in step 2014, the block is then de-allocated in IFS cache 1548.

The block promotion steps 1928 and 2022 are performed as already described with respect to FIG. 9, except that step 924 changes the tier in the block's Inode entry rather than in a BDT entry. In addition, in an embodiment, unlike the NFS/SFS embodiment described previously, a block promoted to a higher tier does not retain its space allocation on the NST 210. Instead it has space allocated in only the one tier to which it is assigned. Similarly, block demotion is also performed as already described with respect to FIG. 10, except that step 1014 also changes the tier in the block's Inode entry rather than in a BDT entry. In addition, since the space allocation for the block on the NST 210 was not retained when the block was promoted, demotion back into the NST 210 involves allocating space for it anew in the NST 210.

Figure 21:
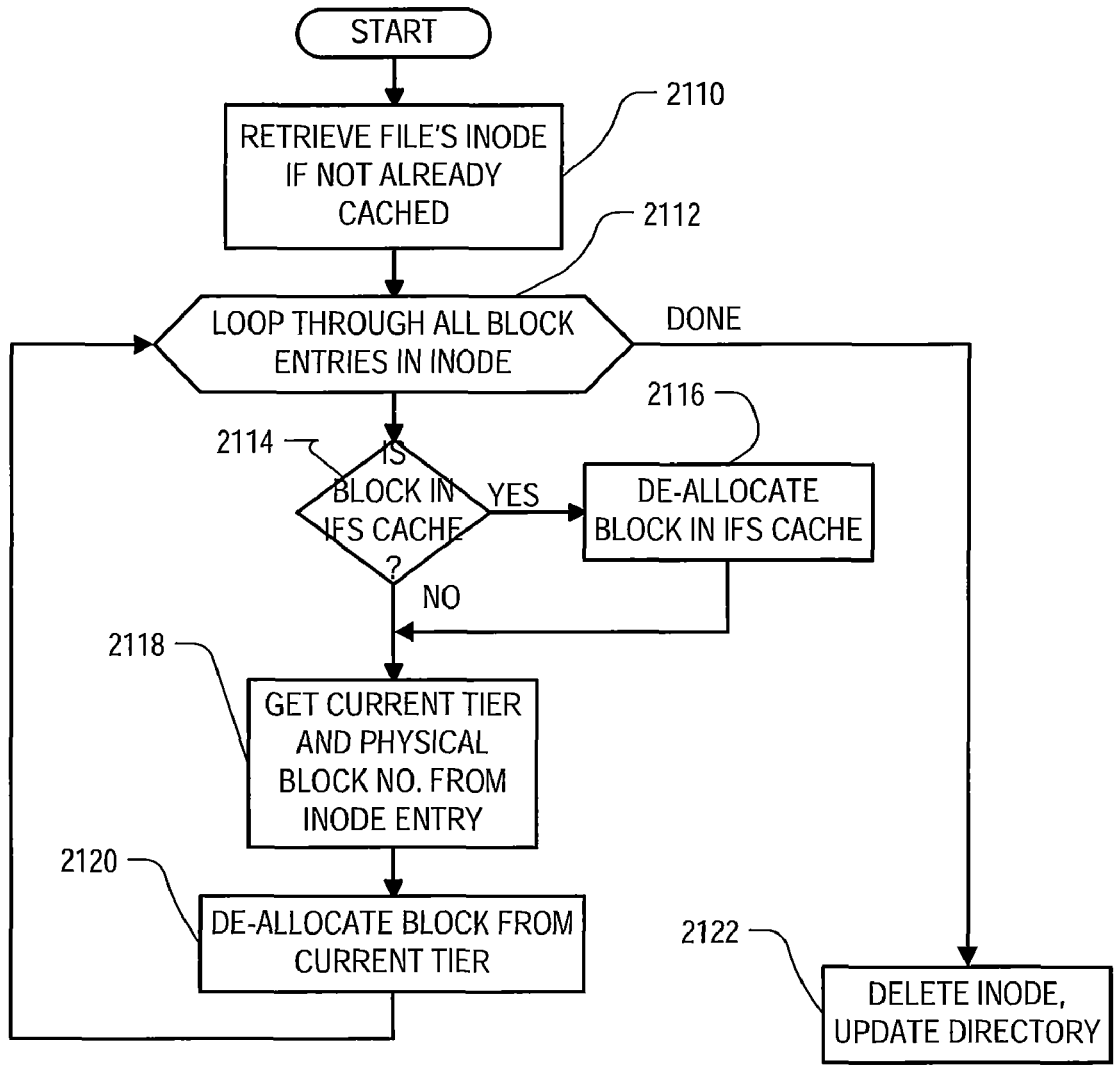

FIG. 21 is a flow chart of a routine in IFS module 1532 for handling a file deletion request. A similar process can be performed in the SFS embodiment above, with appropriate modifications. Prior to the routine of FIG. 21, the logical file identifier of the file to be deleted has already been converted to an Inode number.

In step 2110, the Inode for the designated file is retrieved into memory if it is not already cached there. In step 2112, the IFS module 1532 begins a loop through all the block entries in the Inode. Again, these are all the logical block numbers in the designated file. In step 2114, it is determined whether the current block is currently in IFS cache 1548. If so, then in step 2116 it is de-allocated in IFS cache 1548. Either way, in step 2118, the IFS module 1532 then obtains the current tier and physical block number on that tier, from the current Inode entry 1614. In step 2120, IFS module 1532 de-allocates that physical block from the indicated storage tier. The routine then loops back to step 2112 to consider the next logical block number in the Inode. After all the blocks identified in the Inode 1612 have been considered and de-allocated from both IFS cache 1548 and their current storage tier, the Inode 1612 is then itself deleted as well in step 2122. Note that the method of FIG. 21 can also be used for a file truncation operation in which the file size is to be reduced, by deleting only some number of blocks from the end of the file. The blocks to be deleted in this case are the last number of blocks identified in the file's Inode.

Figure 22:
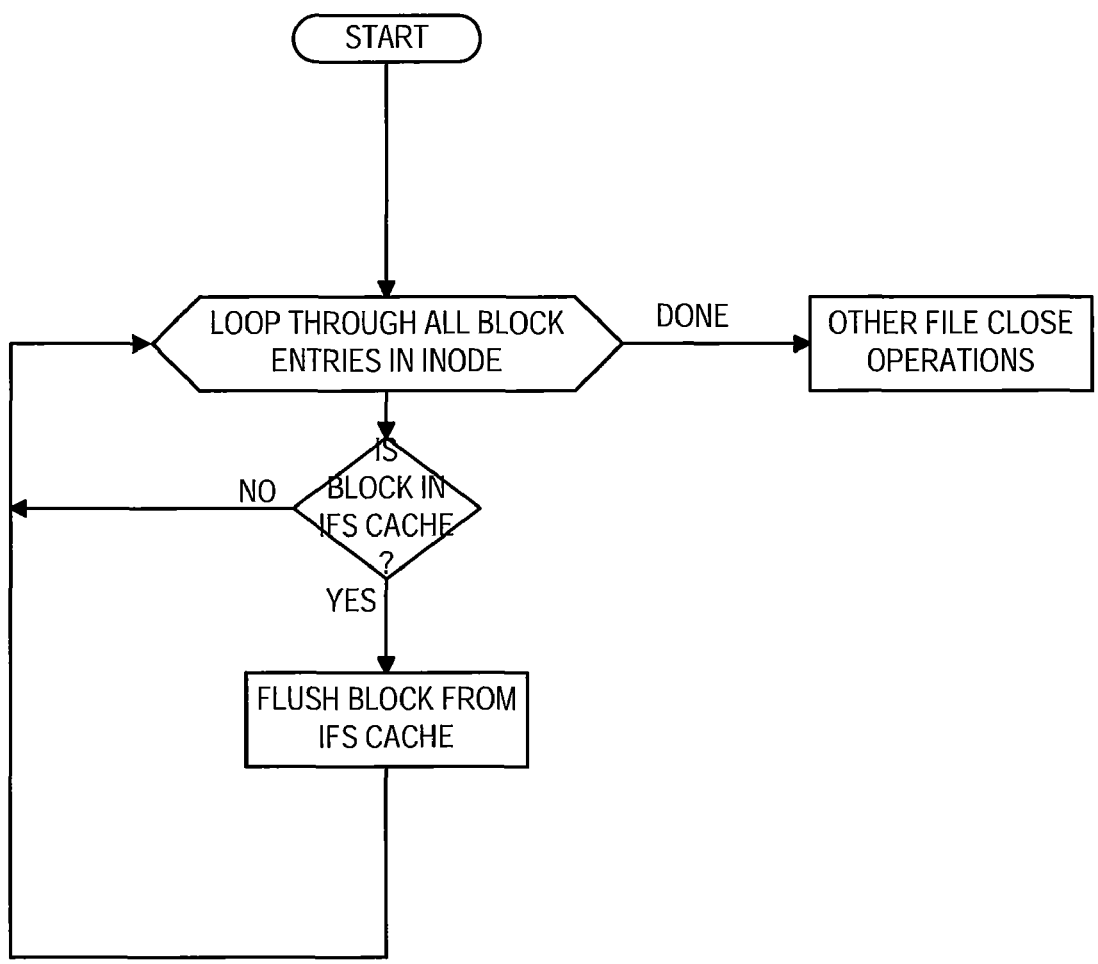

FIG. 22 is a flow chart of a routine in IFS module 1532 for handling a file close request. A similar process can be performed in the SFS embodiment above, with appropriate modifications. Prior to the routine of FIG. 22, the logical file identifier of the file to be deleted has already been converted to an Inode number.

In step 2210, the IFS module 1532 begins a loop through all the block entries in the Inode 1612 for the file to be closed. Again, these are all the logical block numbers in the designated file. In step 2212, it is determined whether the current block is currently in IFS cache 1548. If so, then in step 2214 it is flushed as described previously with respect to FIG. 20. Either way, the routine then loops back to step 2210 to consider the next logical block number in the Inode. After all the blocks identified in the Inode 1612 have been considered and flushed from IFS cache 1548 if necessary, then other necessary file close operations are performed in step 2216.

Alternative Tier Superblock Embodiment

An embodiment of a tier super block was described earlier. In an alternative embodiment, the double linked list in order of access counts also performs the functions of the free list for blocks on a particular tier. In this embodiment, all blocks on the tier have a corresponding entry in the double linked list, even those that are not allocated. Each entry in the doubly linked list also indicates the access count for that block. If the access count for a particular block is zero, that block is not currently allocated and is available for use. The access count for a block is forced to zero on initialization, and also if the block to which it corresponds on that tier has been de-allocated due either to truncation or deletion of the file.

Since the blocks are identified in the linked list in non-decreasing order of popularity, the head pointer always points to the entry for a free block (if there are any). Thus when a block is being promoted to a particular tier, the filesystem module always looks at the entry in the linked list pointed to by the head pointer. If the access count in that entry is zero, then its corresponding block on the tier is free and can be used. If it is not zero, then the block to which it refers is the one to be demoted to a lower tier because it is known to have the lowest access count of any block in the tier. When the promoted block is written into the tier, the access count for the block in that tier is set to the access count of the block when it was assigned to the lower tier, before promotion.

As used herein, the term "database" does not necessarily imply any unity of structure. For example, two or more separate databases, when considered together, still constitute a "database" as that term is used herein.

Also as used herein, the "identification" of an item of information does not necessarily require the direct specification of that item of information. Information can be "identified" in a field by simply referring to the actual information through one or more layers of indirection, or by identifying one or more items of different information which are together sufficient to determine the actual item of information. In addition, the term "indicate" is used herein to mean the same as "identify".

Also as used herein, a given event or value is "responsive" to a predecessor event or value if the predecessor event or value influenced the given event or value. If there is an intervening processing element, step or time period, the given event or value can still be "responsive" to the predecessor event or value. If the intervening processing element or step combines more than one event or value, the output or result of the processing element or step is considered "responsive" to each of the event or value inputs. If the given event or value is the same as the predecessor event or value, this is merely a degenerate case in which the given event or value is still considered to be "responsive" to the predecessor event or value. "Dependency" of a given event or value upon another event or value is defined similarly.

What is claimed is:

1. A method for writing a provided block of data to a tiered storage system which includes a plurality of tiers of persistent storage including an N'th tier and an N−1'th tier, the N−1'th tier having faster performance than the N'th tier, for use with a filesystem module that, when executed on a computer system, maintains a logical-to-physical mapping of blocks within files of a filesystem;

for use with a block assignment database stored accessibly to the computer system, the block assignment database indicating, at block level granularity, to which of the tiers each of a plurality of data blocks including the provided data block are assigned in the tiered storage system, the database further indicating a popularity measure of each of the data blocks in the plurality, the provided data block having one popularity and at least one other data block in the same file as the provided data block having a different popularity, comprising the steps of:
  the computer system, under control of the filesystem module, determining in dependence upon the block assignment database that the tier to which the provided data block is currently assigned is the N'th tier;
  the computer system, under control of the filesystem module, deciding in dependence upon the popularity measures indicated in the block assignment database a target tier into which the provided data block should be written;
  if the deciding step decides that the provided data block should be promoted to the N−1'th tier then the computer system, under control of the filesystem module, writing the provided data block to the N−1'th tier; and
  if the deciding step decides that the provided data block should be written to the N'th tier then the computer system, under control of the filesystem module, writing the provided data block to the N'th tier.

2. A method according to claim 1, further comprising the step of, if the deciding step decides that the provided data block should be promoted to the N−1'th tier then the computer system updating the block assignment database to indicate that the tier to which the provided data block is assigned is the N−1'th tier.

3. A method according to claim 1, wherein the provided block of data has a logical block identifier associated with it,
  wherein the step of writing the provided block of data to the N−1'th tier comprises the steps of:
    translating the logical block identifier to an N−1'th tier physical block identifier according to a mapping for the N−1'th tier; and
    writing the provided block of data to the block on the N−1'th tier identified by the N−1'th tier physical block identifier,
  and wherein the step of writing the provided block of data to the N'th tier comprises the steps of:
    translating the logical block identifier to a N'th tier physical block identifier according to a mapping for the N'th tier; and
    writing the provided block of data to the block on the N'th tier identified by the N'th tier physical block identifier.

4. A method according to claim 3, wherein the step of translating the logical block identifier to a N−1'th tier physical block identifier comprises the step of consulting a database which indicates, for each given one of a plurality of logical block identifiers, both the tier to which the given block is currently assigned, and the physical block identifier of the given block on that tier.

5. A method according to claim 1, wherein each higher tier in the plurality of tiers has faster performance than the tier(s) below it,
  wherein the step of deciding a target tier includes a step of determining the highest tier in the plurality of tiers for which the block's popularity is at least as high as a promotion threshold for the tier, the promotion threshold for each higher tier being higher than the promotion threshold for each of the tier(s) below it.

6. A method according to claim 1, wherein each higher tier in the plurality of tiers has faster performance than the tier(s) below it, and wherein if the deciding step decides that the provided data block should be promoted to the N−1'th tier, then the computer system further performing the steps of:
  selecting a demotion block in the N−1'th tier, in dependence upon a popularity of the demotion block relative to other blocks assigned to the N−1'th tier; and
  re-assigning the demotion block to a tier lower than the N−1'th tier prior to the step of writing the provided block of data to the N−1'th tier.

7. A method according to claim 1, for use with a cache memory that caches blocks of data for the tiered storage system,
  wherein the provided block of data is cached in a modified state in the cache memory,
  and wherein the method is performed in response to a flush operation of the provided block from the cache memory.

8. A method according to claim 1, for use with a cache memory that caches blocks of data for the tiered storage system,
  wherein the provided block of data is being provided as part of a write-through operation on the cache memory.

9. A method according to claim 1, wherein the popularity measure of each given one of the data blocks in the plurality of data blocks is maintained in dependence upon a number of read accesses to the given data block within a recent period of time.

10. A method according to claim 9, wherein the popularity measure of each given one of the data blocks in the plurality of data blocks is maintained further in dependence upon a number of write accesses to the given data block within a recent period of time.

11. A method according to claim 1, wherein the popularity measures are stored persistently and cached in non-persistent memory in the computer system.

12. A method according to claim 1, further comprising the step of, in conjunction with the writing of the provided data block, the step of storing in persistent storage a measure of the popularity of the provided block.

13. A method according to claim 12, for use with a cache memory that caches blocks of data for the tiered storage system,
  further comprising the step, prior to the step of deciding a target tier, of reading from the block a number of times while it is in the cache memory and in conjunction with each such read, increasing an in-memory version of a measure of the block's popularity,
  and wherein the step of deciding a target tier depends on the block's popularity as indicated by the in-memory version of a measure of the block's popularity.

14. A method according to claim 13, wherein the step of storing in persistent storage a measure of the popularity of the block comprises the step of storing in persistent storage the in-memory version of a measure of the block's popularity.

15. A method according to claim 12, further comprising, in response to a request to read the block, the request received while the block is not in the cache memory, the steps of:
  retrieving the block from persistent storage; and
  retrieving into memory from persistent storage the measure of the popularity of the block.

16. A method according to claim 1, wherein the filesystem module comprises first and second filesystem sub-modules, the first filesystem sub-module being responsible for the N'th tier and the second filesystem sub-module being responsible for the N−1'th tier.

* * * * *